United States Patent
Noda et al.

(10) Patent No.: US 9,465,387 B2
(45) Date of Patent: Oct. 11, 2016

(54) ANOMALY DIAGNOSIS SYSTEM AND ANOMALY DIAGNOSIS METHOD

(71) Applicant: Hitachi Power Solutions Co., Ltd., Hitachi-shi, Ibaraki (JP)

(72) Inventors: Toujirou Noda, Ibaraki (JP); Shigeyoshi Chikuma, Ibaraki (JP); Masami Kusano, Ibaraki (JP); Naoki Miyakoshi, Ibaraki (JP); Tadashi Suzuki, Ibaraki (JP); Hisae Shibuya, Tokyo (JP)

(73) Assignee: Hitachi Power Solutions Co., Ltd., Hitachi-shi (JP)

( * ) Notice: Subject to any disclaimer, the term of this patent is extended or adjusted under 35 U.S.C. 154(b) by 0 days.

(21) Appl. No.: 14/982,138

(22) Filed: Dec. 29, 2015

(65) Prior Publication Data

US 2016/0202693 A1    Jul. 14, 2016

(30) Foreign Application Priority Data

Jan. 9, 2015 (JP) ................................. 2015-003247
Jan. 9, 2015 (JP) ................................. 2015-003256

(51) Int. Cl.
 *G05B 23/02* (2006.01)
(52) U.S. Cl.
 CPC ................................. *G05B 23/0283* (2013.01)
(58) Field of Classification Search
 CPC .......... G05B 23/0283; G05B 23/0235; F16C 19/52; G07C 3/00; G06F 11/0778
 USPC ......... 702/56, 179, 180, 183, 184, 185, 188, 702/193; 700/108, 109, 110, 121; 714/4
 See application file for complete search history.

(56) References Cited

U.S. PATENT DOCUMENTS 5,602,761 A * 2/1997 Spoerre .................. G01H 1/003
 702/179

(Continued)

FOREIGN PATENT DOCUMENTS

| JP | 2013-58099 A | 3/2013 |
| JP | 2013-152655 A | 8/2013 |
| WO | WO 2013/111397 A1 | 8/2013 |

OTHER PUBLICATIONS

Decision to Grant issued in counterpart Japanese Application No. 2015-003247 dated Sep. 28, 2015 with partial English-language translation (two (2) pages).
Decision to Grant issued in counterpart Japanese Application No. 2015-003256 dated Sep. 28, 2015 with partial English-language translation (two (2) pages).

(Continued)

*Primary Examiner* — John H Le
(74) *Attorney, Agent, or Firm* — Crowell & Moring LLP

(57) ABSTRACT

The anomaly diagnosis system includes the state measure calculator acquiring sensor data from sensors in a machine facility as time series data; an approximation formula calculator calculating a state measure being an index indicating a state of the machine facility, such as anomaly and a performance by a statistical method in which the time series data is used as learned data; and a state measure estimating unit estimating the state measures until future time using the approximation formula. Whenever the latest time series data is acquired, the reference period in which the time series data corresponding to the state measure referred to calculate the approximation formula by the reference period setting unit, is successively extended by addition of time when the latest time series data is acquired. The approximation formula calculator calculates the approximation formula using the state measure of the time series data acquired in the reference period.

17 Claims, 10 Drawing Sheets

(56) References Cited

U.S. PATENT DOCUMENTS

| | | | |
|---|---|---|---|
| 6,041,287 A * | 3/2000 | Dister | B60L 3/0023 702/182 |
| 6,766,275 B2 * | 7/2004 | Samata | G05B 23/0283 702/184 |
| 2009/0319232 A1 * | 12/2009 | Griessler | G01M 13/045 702/184 |

OTHER PUBLICATIONS

Office Action issued in counterpart Japanese Application No. 2015-003247 dated Apr. 30, 2015 with English-language translation (four (4) pages).

Office Action issued in counterpart Japanese Application No. 2015-003256 dated Apr. 30, 2015 with English-language translation (four (4) pages).

* cited by examiner

ANOMALY DIAGNOSIS SYSTEM AND ANOMALY DIAGNOSIS METHOD

CROSS REFERENCE TO RELATED APPLICATION

The present application is based on Japanese application JP 2015-3247 filed on Jan. 9, 2015 and Japanese application JP 2015-3256 filed on Jan. 9, 2015, the contents of which are hereby incorporated by reference into this application.

BACKGROUND OF THE INVENTION

1. Field of the Invention

The present invention relates to a anomaly diagnosis system and a anomaly diagnosis method, for diagnosing a state of a machine facility.

2. Description of the Related Art

In various types of machine facilities such as construction machinery, medical devices, power generation facilities using wind power, photovoltaic power, or thermal power, water treatment plants, and other plants, a periodic maintenance is previously conducted to avoid an adverse influence on customers such as a decrease in operation ratio, unachievement of the final specification due to deterioration in performance or quality, and deficiency in reliability. However, though the periodical maintenance is conducted, shutdown of a machine facility due to a trouble and a performance decreases cannot be avoided. Accordingly, a concept of monitoring a performance or a quality in addition to an earlier discovery of an error based on data of sensors added to the machinery facility becomes important in addition to an earlier discovery of an abnormality based on the data of the sensor added to the machine facility.

However, it was difficult to grasp a state of a machine facility from a large quantity of sensor data, machine facility information, and maintenance history information and predict remaining operable hours without any trouble (continuous operation hours of the facility) because it requires both knowledge of designing and the site and a large quantity of data analysis.

For example, JP2013-152655 A disclosed an abnormality diagnosis method for estimating an anomaly measure of the machine facility and an RUL (Remaining Useful Life) by applying Gaussian Process, a k-NN (k-nearest neighbor) method, and Particle filter method to multi-dimensional sensor data obtained from the machinery facility.

Further, JP2013-58099 A disclosed a technology in which a process state quantity of a plant is acquired, and a performance estimation index of the control system is calculated at every first period (for example one day) and calculates a trend using a performance estimation index value for a second period (for example, one month) which is longer than the first period (for example, one day).

SUMMARY OF THE INVENTION

An aspect of the present invention provides an anomaly diagnosis system diagnosing a state of a machine facility, comprising:

a time series data receiver acquiring sensor data as time series data from a plurality of sensors installed in the machine facility;

a state measure calculator calculating an anomaly measure or a performance measure as a state measure being an index indicating a state of the machine facility, by a statistical method in which the time series data is used as learned data, the anomaly measure being an index indicating a magnitude of deviation from a normal state of the machine facility, and the performance measure being an index indicating a performance of the machine facility;

an approximation formula calculator calculating an approximation formula approximating, with a polynomial expression, variation in the state measure calculated based on the time series data acquired from a past to the present;

a state measure estimating unit estimating the state measure until a predetermined future time using the approximation formula; and a reference period setting unit setting a reference period being a period for which the time series data corresponding to the state measure is acquired, the approximation calculator referring the reference period to calculate the approximation formula, wherein the reference period setting unit sets, as the reference period, a first period including time when latest time series data is acquired or a second period shorter than the first period and including the time when the latest time series data is acquired, and wherein the approximation calculator calculates the approximation formula using the state measure regarding the time series data acquired for the reference period set by the reference period setting unit.

DETAILED DESCRIPTION OF THE INVENTION

Prior to describing an embodiment of the present invention, the above-mentioned related art will be further argued.

In JP 2013-152655 A disclosed, an inclination of an anomaly measure around neighboring period after the maintenance operation, there is cases where it is difficult to make estimation of an anomaly measure and RUL estimation with sufficient accuracies. Further, as disclosed in JP2013-58099 A, there may be a case where it is difficult to make estimation for a long period such as a life time of the whole of the machine facility when time series data regarding a predetermined time length period is used to calculate a trend.

According to the present invention, a long period estimation of a state of a machine facility can be provided with a preferable accuracy.

Embodiments of the present invention are described in detail with reference to drawings. In each of the drawings, the same or correspond part are designated with the like reference to omit duplicated descriptions.

First Embodiment

A anomaly diagnosis system according to a first embodiment of the present invention can provide information for anomaly diagnosis for detecting occurrence of abnormality or a decrease in performance by grasping an anomaly measure, which is an index indicating a magnitude of deviation from a normal state of a machine facility, in order to maintain and increase an operation ratio of the machine facility used in a factory, a commercial facility, a construction site, a hospital, etc. Accordingly, sensor data or operation information, event information, and information regarding a facility load, operation reports, etc. in addition to the sensor data are obtained from the machine facility as a diagnosis target. A state measure of the machine facility from now to a future is estimated, and further a remaining useful life (RUL: remaining useful life) of the machine facility is estimated using the acquired information.

Figure 11:
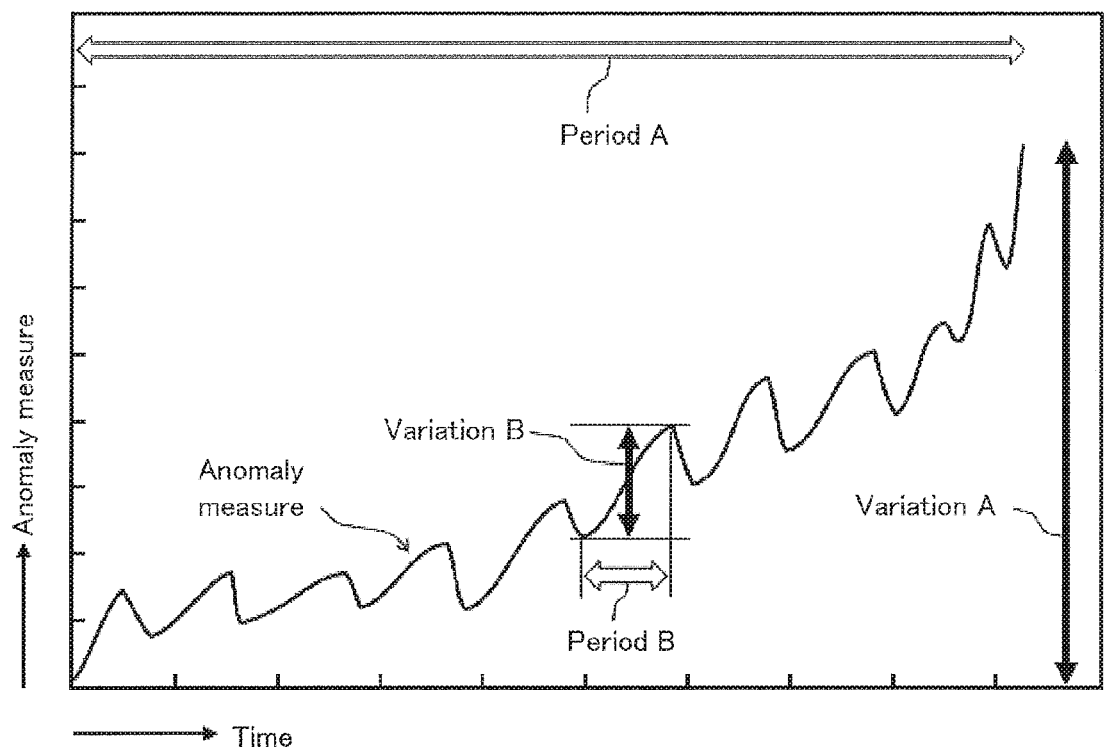
FIG. 11 is a graphical chart schematically illustrating a variation in the error measure of a machine facility to be a diagnosis target of the anomaly diagnosis system according to the first embodiment of the present invention.

An aging variation in the state measure of a machine facility is described with reference to FIG. 11. In FIG. 11, explanation is made with an anomaly measure of which index value increases as the state of the machine facility is deteriorated. On the other hand, even if a performance measure of which index value decreases as the state of the machine facility is deteriorated, is used, operation is similar with only difference in the direction of change.

As the anomaly measure of the machine facility, there are a variation due to deterioration in components requiring a short-interval replacement because the components are relatively easy to be deteriorated, and a variation requiring a large scale maintenance operation such as overhaul or replacement of a major unit because of deterioration over the whole of the machine facility. A variation B due to deterioration in the components occurs as a variation for a relatively short interval B. On the other hand, a variation A occurs such that the whole of the machine facility is deteriorated as an increasing variation in which the variation gradually increases for a relatively long period A.

Accordingly, the anomaly diagnosis system according to the first embodiment of the present invention, estimates the variation particularly for a long period, with a preferable accuracy to provide information for the anomaly diagnosis.

In addition, in the present specification, "performance" of the machine facility corresponds to an outputting mode other than the functions the machine facility originally has, and a quantity or quality variations relating to a quality of the products manufactured by the machine facility. For example, "performance" indicates a degree of mileage becoming low in a gas engine and a degree of deterioration in accuracy of the processing a subject in a press machine.

Further, "RUL" corresponds to a period for which the machine facility as a diagnosis target operates within a normal range, but also corresponds to a period for which the performance reaches to a state in which the performance decreases under a predetermined level (for example, 60% of the maximum performance). As a result, before excessive decrease in the performance of the machine facility, a predetermined maintenance operation can be made to make it possible to maintain a productivity of the machine facility.

Further, "anomaly diagnosis" is not limited to the diagnosis whether the machine facility reaches an abnormal state in which the machine facility becomes in an abnormality state, but includes a diagnosis what degree the performance of the machine facility decreases though the machine facility is operable within a normal state range.

[Structure of Anomaly Diagnosis System]

First, a configuration of an anomaly diagnosis system 1 according to the first embodiment is described with reference to FIG. 1.

Figure 1:
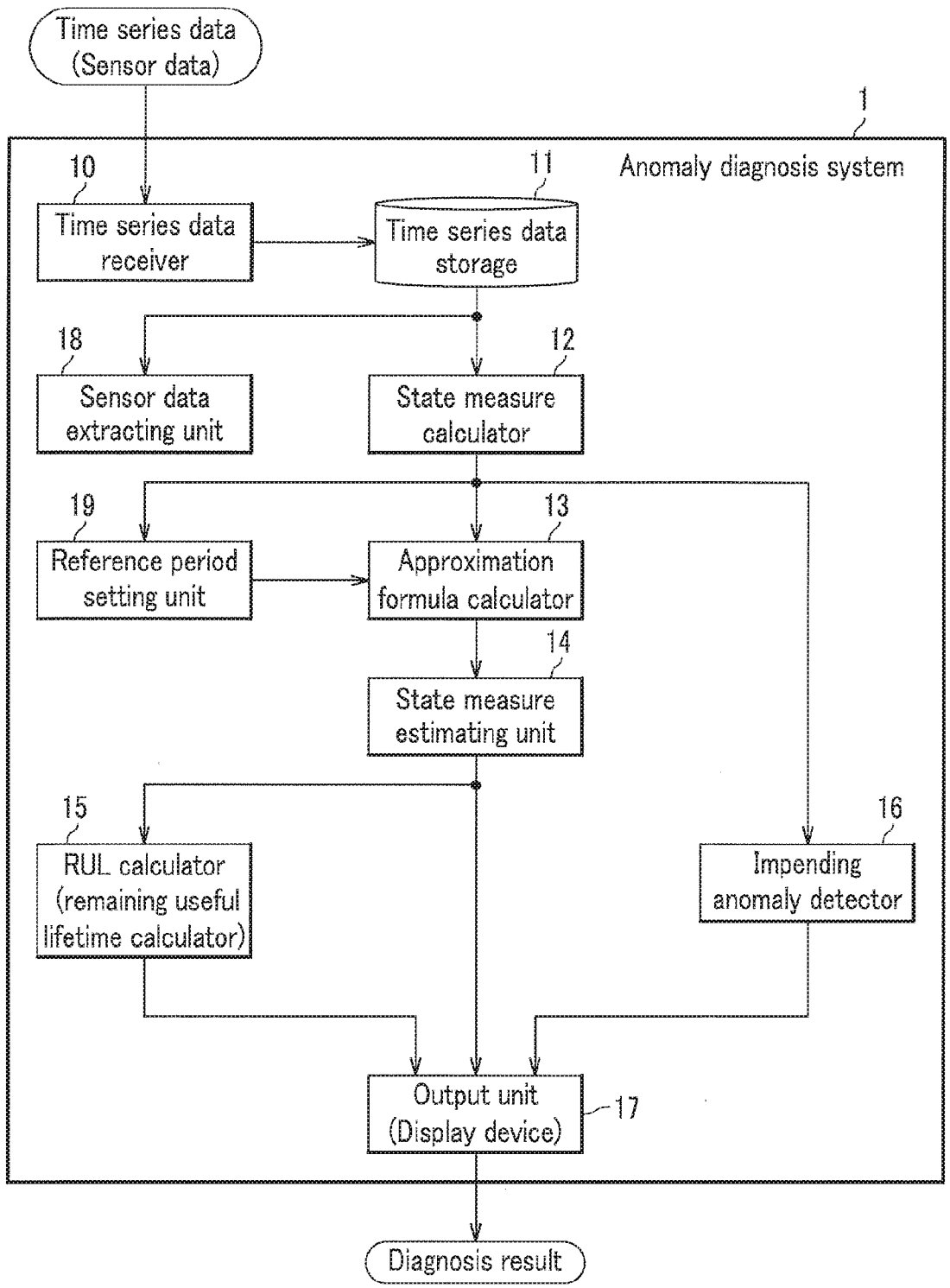
FIG. 1 is a block diagram illustrating a configuration of a anomaly diagnosis method according to a first embodiment of the present invention.

As shown in FIG. 1, the anomaly diagnosis system 1 includes a time series data receiver 10, a time series data storage 11, a state measure calculator 12, an approximation formula calculator 13, a state measure estimating unit 14, an RUL calculator (remaining useful lifetime calculator) 15, an impending anomaly detector 16, an output unit 17, a sensor data extracting unit 18, and a reference period setting unit 19.

The time series data receiver 10 is a means for acquiring a multi-dimensional sensor data outputted by the machine facility as a diagnosis target through the Internet network, etc. The sensor data is handled as time series data associated with acquiring time (or time measured by the sensor). The time series data receiver 10 successively stores the acquired latest (current) time series data whenever the time series data receiver 10 acquires the time series data in the time series data storage 11.

The current time series data can be directly applied to the state measure calculator 12 by the time series data receiver 10.

The time series data storage 11 is a unit for storing the time series data inputted from the time series data receiver 10. Further, the time series data stored in the time series data storage 11 is appropriately referred as past and current time series data by the state measure calculator 12 and the sensor data extracting unit 18.

In addition, when newly acquired time series data is added to the time series data storage 11, the data is stored after the data is estimated regarding its appropriateness (not abnormal, and having similarity to the data which has been stored in the time series data storage 11) as data by not-shown evaluating means to be practically used as past time series data in a normal state.

When there are a plurality of machine facilities as the diagnosis target, the time series data is stored with association with each of the machine facilities as a diagnosis unit.

It is also allowed that the time series data stored in the time series data storage 11 includes event data, operation data, load data, maintenance history data, etc as circumferential data in addition to the sensor data. Each piece of the data is associated with time when the data is acquired.

The event data is data indicating an operation state of the machine facility and indicates, for example, a control state of operation patterns such as a start-up or stoppage of the machine facility.

The operation data is data indicating an operation time or its accumulation time such as operation time, manipulation time, or the like of the machine facility. For example, in a shovel, the operation data corresponds to detailed time periods of travelling time, time of revolving operation, etc correspond to the operation data.

The load data is data indicating a load state on the machine facility and corresponds to, for example, a load state on the engine or a mileage, the number of patients in a medical facility, a hardness of a work to be processed in a machine tool.

The maintenance history data is data indicating operation history such as past failure details, replacement of components, etc regarding the machine facility and includes a list of operation items carried out as the maintenance operation.

The state measure calculator 12 is a unit for calculating a certain state measure as an index indicating a state of the machine facility by a statistical method using the time series data as learned data with reference to the current and past time series data stored in the time series data storage 11. Further, the state measure calculator 12 inputs a type of the sensor data used when the state measure is calculated from the sensor data extracting unit 18, and calculates the state measure using a multi-dimension sensor data. The state measure calculator 12 supplies the calculated state measures to the approximation formula calculator 13, the impending anomaly detector 16, and the reference period setting unit 19. Further, the state measure calculator 12 may be configured as follows:

The state measure calculator 12 accumulates the calculated state measure in a not-shown storing means as the time series data, and the time series data of the state measure for a period demanded for the approximation formula calculator 13, etc.

Figure 2:
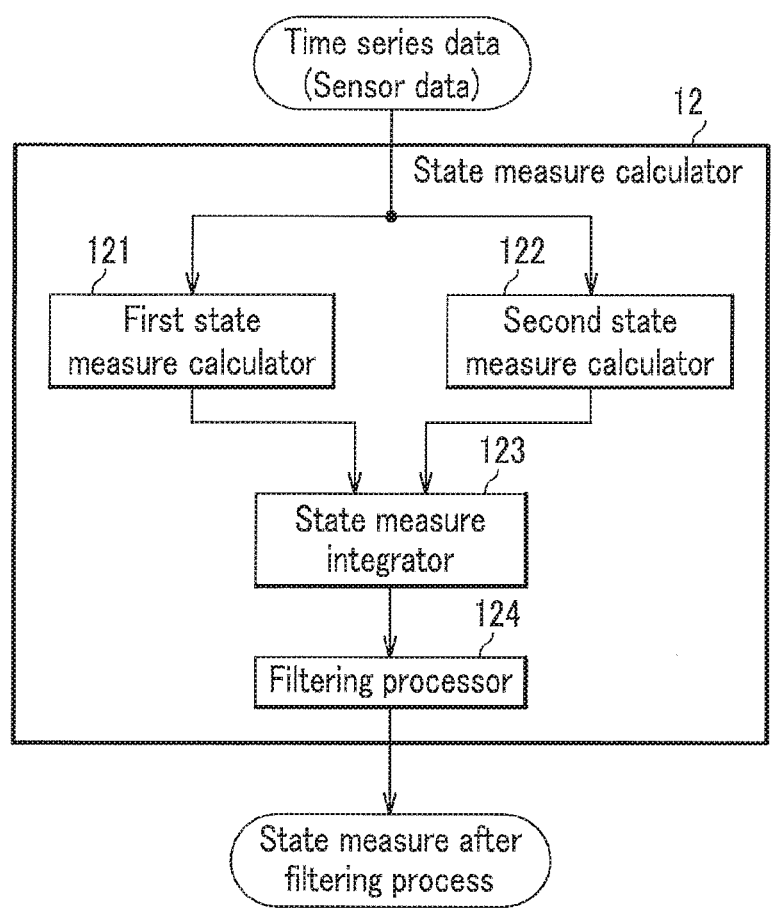
FIG. 2 is a block diagram illustrating a configuration of a state measure calculator in the anomaly diagnosis system according to the first embodiment of the present invention.

The state measure calculator 12 includes, as shown in FIG. 2, a first state measure calculator 121, a second state measure calculator 122, a state measure integrator 123, and a filtering processor 124. The first state measure calculator 121 and a second state measure calculator 122 are units calculating the state measures by methods different from each other. The first state measure calculator 121 and the second state measure calculator 122 supplies their calculated state measures to a state measure integrator 123.

As a method of calculating the state measure, a vector quantization method or a local subspace method are usable. These methods for calculating the state measure will be described later.

The first state measure calculator 121 and the second state measure calculator 122 can use multi-dimensional sensor data as a multi-dimensional vectors as they are, and also can be used as feature quantities undergone feature transformation, respectively.

As a feature transformation, for example, a principal component analysis, an independent components analysis, a wavelet transformation, etc are usable. Undergoing the feature transformation makes it possible to decrease the number of dimension of the time series data or increase a sensitivity of the state measure.

The state measure integrator 123 inputs the state measures calculated and sent by the first state measure calculator 121 and the second state measure calculator 122 and integrates the two state measures into one value and supplies the value to a filtering processor 124.

As the method of integrating the two state measures, a harmonic mean, a weighted average, etc. are usable. Particularly, it is preferable to use the harmonic mean in order that the state measures calculated by different methods are integrated such that characteristics of these state measures are not deteriorated and are not excessively enhanced.

The methods for calculating the satiate measures are not limited two, but may be one or more than two. Further, when the state measure is calculated by more than two methods, it is preferable to integrate the state measures into one value by the harmonic mean.

The filtering processor 124 inputs the state measure which has been integrated into one value from the state measure integrator 123, and enhances sensitivity or a reliability of the state diagnosis and performs a predetermined filtering process in a time base direction. The state measure after the filtering process by the filtering processor 124 is supplied to the approximation formula calculator 13, the impending anomaly detector 16, and the reference period setting unit 19 shown in FIG. 1.

Further, in the present embodiment, the integrated state measure is undergone the filtering process. However, it is possible to make integration after the filtering process is applied to the state measure calculated each of the method.

As a method of the filtering process, for example, a moving average filter for calculating a moving average for a predetermined time period, a minimum filter for calculating a minimum value for the predetermined time period, a maximum filter for calculating a maximum value for the predetermined time period, etc. are usable.

Figure 5:
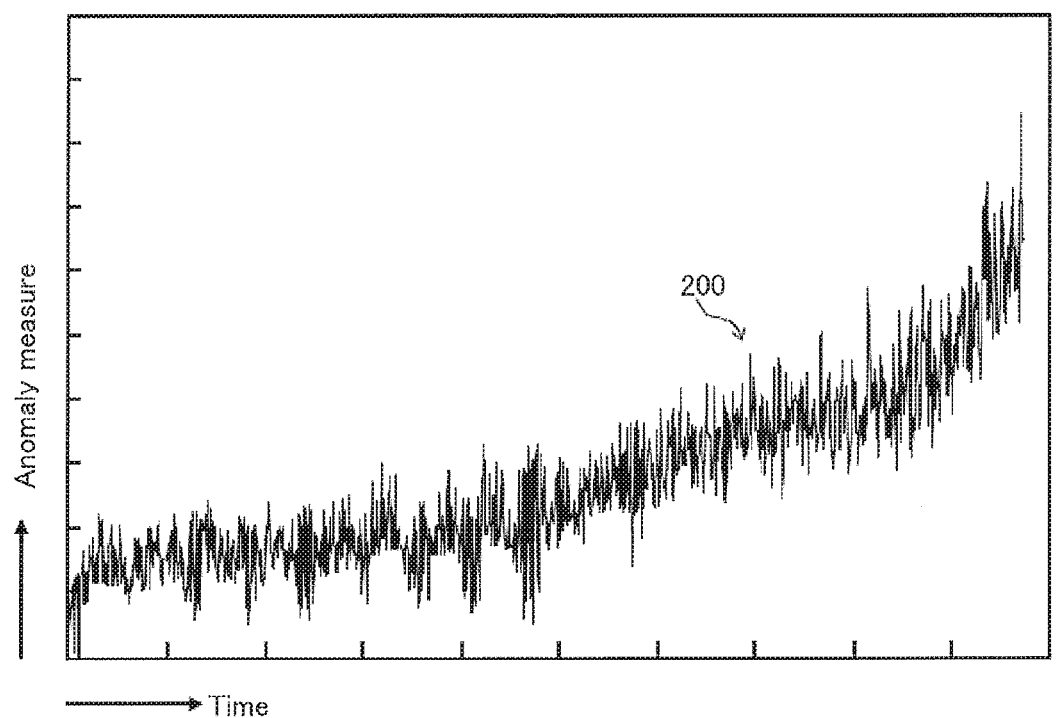
FIG. 5 is a graphic chart schematically illustrating an example of an error measure used in the first embodiment of the present invention.

An explanation is made for the case to which the filtering process is applied, where an anomaly measure, having an the index value increases to such an extent that the state of the machine facility is deteriorated as shown in FIG. 5, is used as the state measure.

Figure 6:
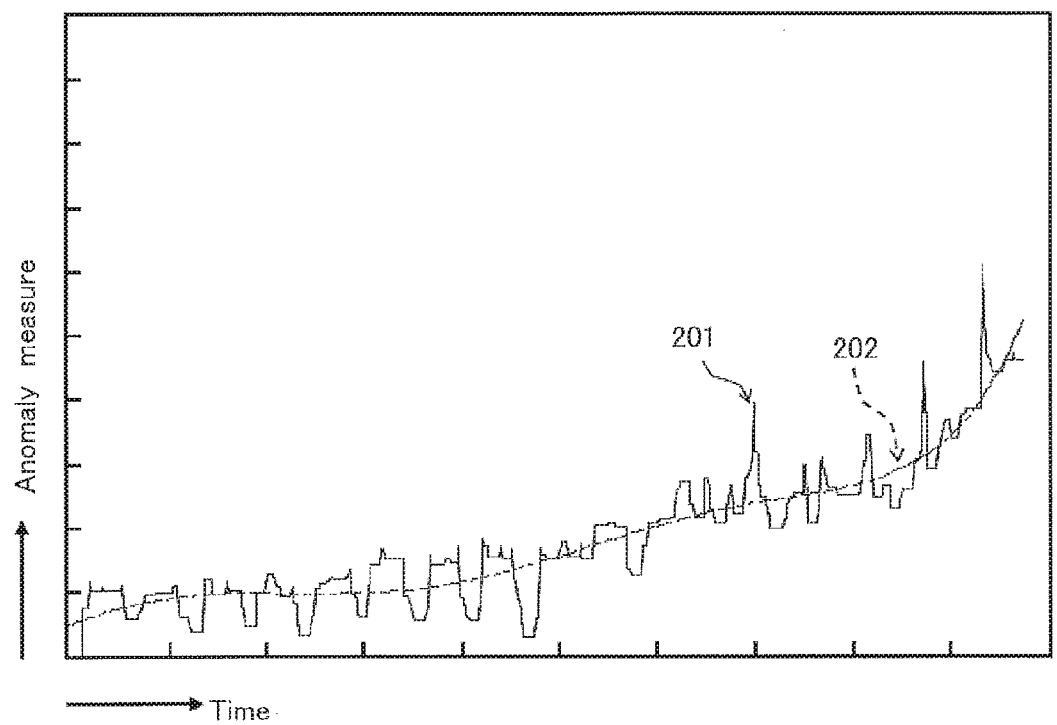
FIG. 6 is a graphical chart schematically illustrating an example of an error measurement after a filtering process used in the first embodiment of the present invention.

When the minimum filter is used for the filtering process, for example, a waveform 200 of the anomaly measure varying with upward and downward vibrations is converted into such a waveform 201 having small peaks as shown in FIG. 6, in which lower values as fine peaks are connected. When the minimum filter is used, it can be suppressed that the increase in the anomaly measure is excessively evaluated by superimposition of noises. Accordingly, the anomaly diagnosis can be made with a high possibility.

Further, when the maximum filter is used as the filtering process, the maximum value of the anomaly measure can be grasped without miss. Accordingly, the abnormality diagnosis can be made with a high sensitivity.

Further, when the moving average filter is used as the filtering process, an anomaly diagnosis having an intermediate characteristic between the maximum filter and the minimum filter can be made.

In these filtering processes, the time period, which is a filter size, can be appropriately determined in accordance with a frequency characteristic of noise components included in the frequency characteristic of the anomaly measure or the anomaly measure.

Further, when as the state measure, a performance measure is used which has an index value decreasing as the state of the machine facility deteriorates, in contrast to the case where the anomaly measure is used, a reliability in the anomaly diagnosis can be enhanced using the maximum filter, on the other hand, a sensitivity in the anomaly diagnosis can be enhanced by using the minimum filter.

Further, for example, a low-pass filtering process may be applied to the state measure used for calculating an approximation formula for a long period anomaly diagnosis to remove or decrease components having a frequency higher than a predetermined frequency. This suppresses influence caused by a short period variation and provides a long period anomaly diagnosis with a high accuracy. As the low-pass filtering process, for example, the filtering process for calculating the moving average for a predetermined time period is usable in which the time period used in calculating the average is adjusted to the frequency components to be removed or decreased.

Further, it can be allowed to combine the low-pass filtering process with the above-described minimum filtering process or the maximum filter.

Next, the two methods for calculating the state measure are described.

In the present embodiment, in any of the methods, "normal data" of the time series data is used, i.e. the time series data acquired by measurement with a sensor during which the machine facility as diagnosis target operates normally is used.

Further, as described above, it is also possible to use the time series data having a feature quantity provided by feature transformation of the sensor data.

Vector Quantization Method

Figure 3:
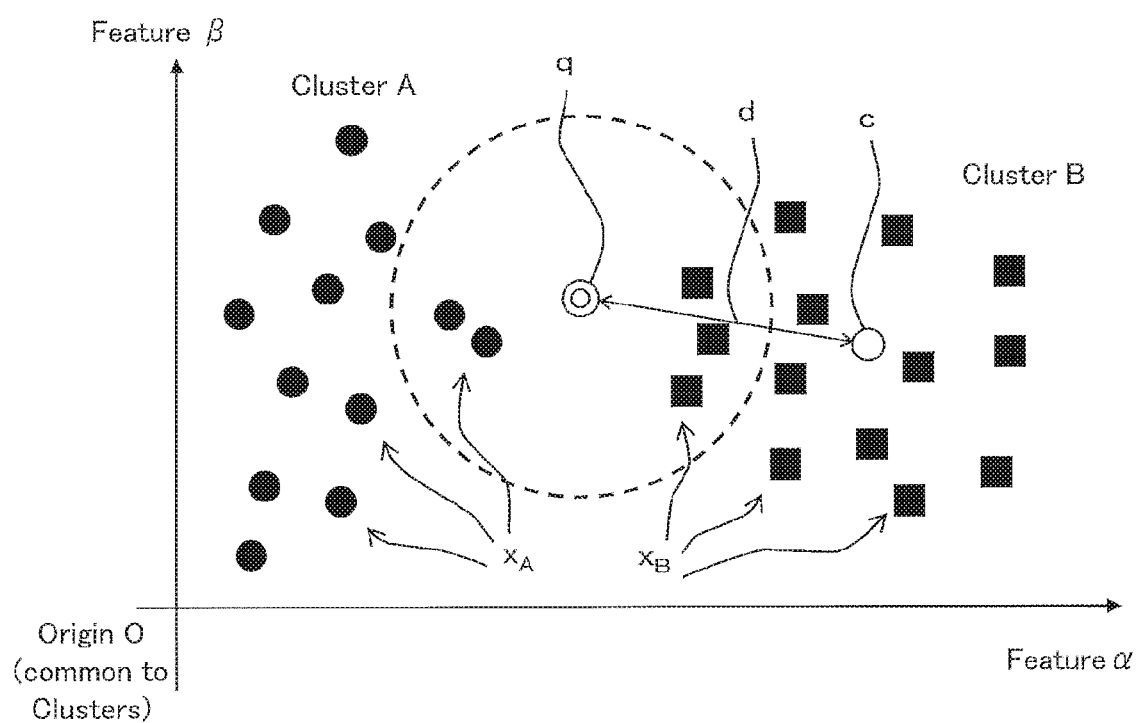
FIG. 3 is a graphical chart used for explaining a k-NN method as an example of a state measure used in the first embodiment of the present invention.

With reference to FIG. 3, a vector quantization method is described.

In the vector quantization method, the normal data is previously undergone clustering as a learned data, the state measure is calculated on the basis of a distance between the current time series data (hereinafter referred to as "diagnosis data") to be diagnosed and the cluster to which the diagnosis data belongs.

According to the vector quantization method, the use of the cluster previously generated provides calculation of the state measure at a high speed with a stable accuracy.

As the clustering method, for example, the K-means clustering can be used. Further, for determination of cluster to which the diagnosis data belongs, for example, k-NN method can be used.

As shown in FIG. 3, it is assumed that the learned data is clustered into cluster A (the cluster including members $x_A$ which are learned data indicated with "solid circle, •"), and cluster B (the cluster including members $x_B$ which are learned data indicated with "solid square, ■").

According to the k-NN method, as shown by a circle of broken lines in FIG. 3, k (five in the example in FIG. 3) of members $x_A$ and $x_B$ near diagnosis data q are extracted. Next, the members extracted in each of clusters is counted as the number of clusters and it is determined that the cluster including the members extracted whose count is largest is the cluster to which the diagnosis data 1 belongs. In the example shown in FIG. 3, the member $x_B$ belonging to the cluster B are extracted whose count is three, which is most. Accordingly, the cluster to which the diagnosis data q belongs is determined as the cluster B.

Next, the anomaly measure is calculated, the anomaly measure being an index indicating a magnitude of deviation from the normal state of the machine facility by using a distance d between the diagnosis data q and a representative value c of the cluster B (for example, a center of gravity of the belonging member can be used), the cluster B being a cluster to which the diagnosis data 1 belongs.

Further, as the anomaly measure, the distance d between the diagnosis data q and the representative value c of the belonging cluster can be used as it is, but it is preferable to normalize the distance d. The normalizing can be performed by dividing the distance d by a radius indicating spreading of the belonging cluster. The radius of the cluster is not specifically limited, but for example, an average value from the representative value c to each of members, a distance from the representative value c to the member most remotely located, a standard deviation of the members or a value of a predetermined number-times the standard deviation are usable.

The determination of the belonging cluster of the diagnosis data q is not limited to the k-NN method. For example, it can be determined that the cluster having a distance between the diagnosis data q and the representative value c of each cluster, which is nearest, can be determined as the belonging cluster.

Further, when the performance measure is used as the state measure, the performance measure can be calculated using the anomaly measure as follows:

As described above, because the anomaly measure indicates the magnitude of a deviation from the normal state of the machine facility (corresponding to the representative value c), the anomaly measure becomes large in accordance with the distance d between the diagnosis data q and the representative value c. In other words, the larger value the anomaly measure has, the more remote from a preferable state the machine facility is in. Accordingly, the performance measure is an index having a value variable in a direction opposite to the anomaly measure. In other words, the larger the distance d, the smaller the performance measure is.

In the present embodiment, the performance measure is calculated as a function of the abnormality which varies in the direction opposite to the abnormality (such that the performance measure having a value becoming smaller in accordance with an increase of the abnormality).

For example, there are equations (1.1) to (1.3) with assumption that the performance measure is y and the anomaly measure is z.

$$y=1/z \text{(where } y=c \text{ when } c>0 \text{ and } z<c) \qquad \text{Eq. (1.1)}$$

$$y=1/(z+c),\text{(where } c>0) \qquad \text{Eq. (1.2)}$$

$$y=c-z\text{(where } c \text{ is, for example, a maximum of } z) \qquad \text{Eq. (1.3)}$$

However, c is a positive constant value in Equations (1.1) to (1.3).

Eq. (1.1) is an inverse of the abnormality z, and Eq. (1.2) is a function in which a positive constant c is added to avoid that the denominator does not become 0 in consideration that the abnormality z may become "0" in Eqs. (1.2) and (1.1), and Eq. (1.3) is a function for subtracting the abnormality z from the constant c.

Local Subspace Method

Figure 4:
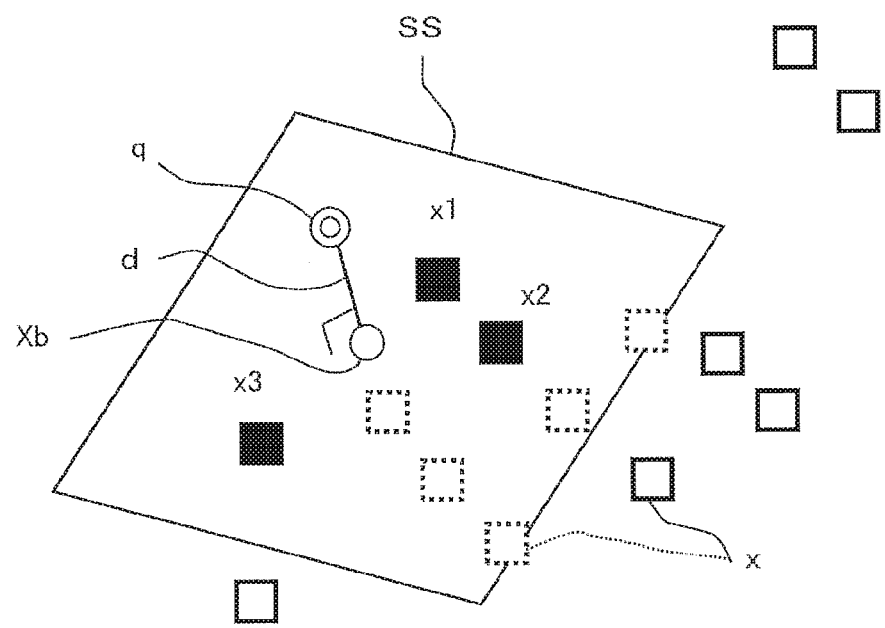
FIG. 4 is an illustration for explaining a local subspace method as an example for calculating a state quantity used in the first embodiment of the present invention.

Referring to FIG. 4, a local subspace method is described.

In the local subspace method, k pieces of normal data, which are nearest neighbor of the diagnosis data q, and the state measure is calculated on the basis of a length of a perpendicular line extending from the diagnosis data q to the local subspace of (k−1) dimension determined by the extracted k pieces of normal data.

According to the local subspace method, because the normal data similar to the diagnosis data are extracted from the accumulated normal data and used, even if the state variation of the machine facility is hard, the state measure can be calculated with the accuracy being kept.

In the example shown in FIG. 4, with assumption of k=3, three pieces of normal data $x_1$, $x_2$, $x_3$ are extracted. A two-dimensional local subspace SS defined by three pieces of normal data is a plane. Next, the distance d from the diagnosis data q to a point at which the perpendicular line intersects the plane of the local subspace SS, is calculated. The distance d may be used as the anomaly measure as it is, however, it is preferable to normalize the distance. The normalizing can be performed by, for example, dividing by a standard deviation of the k pieces of the normal data from which the distance d is extracted.

In addition, in this method, when the performance measure is used as the state measure similarly to the vector quantization method described above, the performance measure can be calculated from the anomaly measure using Eqs. (1.1) to (1.3), etc.

Further, in the present embodiment, for example, the first state measure calculator 121 uses the vector quantization method, and the second state measure calculator 122 uses the local subspace method to calculate the state measures in the above-described procedure, respectively.

Now returning to FIG. 1, the configuration of the anomaly diagnosis system 1 is further described.

The approximation formula calculator 13 is a unit for calculating an approximation formula by a polynomial expression indicating variation in the state measure using the past and current state measures inputted from the state measure calculator 12.

Further, the approximation formula calculator 13 inputs information of a reference period of the time series data of the state measure which is referred when the approximation formula is calculated, i.e., a period for which the time series data (sensor data) corresponding to the state measure to be referred is acquired. Further, the approximation formula calculator 13 calculates the approximation formula which is fitted to the time series data of the state measure in the reference period indicated by the information. Calculating the approximation formula corresponds to calculating each of coefficients in the polynomial expression, which is the approximation formula. Further, the approximation formula calculator 13 supplies the calculated approximation formula to the state measure estimating unit 14.

Further, it is preferable that the approximation formula calculator 13 also calculates an error in the coefficients of the approximation formula. This provides an indication of a reliability of the approximation formula with a magnitude of the error. When the approximation formula calculator 13 calculates the errors in the coefficients, also the errors in the coefficients are supplied to the state measure estimating unit 14.

Further, it is preferable that the reference period is set to all period from an initial stage when the machine facility as a diagnosis target starts a normal operation to the present or from the start of stable operation where an initial predetermined period is excluded to the present. More specifically, the latest time series data can be acquired, the reference period is expanded by a period for which the latest state measure is added whenever the state measure of the data is calculated.

As described above, because the longer the period referred to calculate the approximation formula is extended, the more influences due to short period variations due to deterioration in components are cancelled out, an accuracy in estimating the variation for the long period using the approximation formula can be enhanced.

Further, the number of the degree of the polynomial expression is not specifically limited, but a polynomial expression having one or more degree is usable. In addition, configuration is made such that the number of degree of the polynomial expression is approximately selectable in accordance with the instruction from an operator. For example, a variation of the state measure (anomaly measure) (a waveform 201 indicated by a solid line arrow) and a curve (a waveform 202 indicated by a broken line arrow) drawn by using the approximation formula of the selected degree are displayed on a graphic chart on a display unit, a printer, etc. as shown in FIG. 6. It may be also allowed that an operator can repeat the selection of the degree and re-calculation of the approximation formula until a suitable degree is determined which can be fitted to the curve indicating variation in the state measure (anomaly measure) displayed on a graphical chart.

Polynomial approximation formula of the state measure is explained with an example where approximation formula is made using a cubic function.

When the state measure is y, time is x, the state measure y can be expressed as a three-dimensional function of time x as expressed in Eq. (2.1) using coefficients a, b, c, and d.

$$y=ax^3+bx^2+cx+d \qquad \text{Eq. (2.1)}$$

The coefficients a, b, c, and d can be calculated by application of the least squares method using the time series data of (x, y), which are actually measured data.

Least Squares Method

Also in a case where the degree of least squares method polynomial expression is first, second, fourth or more degree, though the number of coefficients increases or decreases, calculation is possible by the least squares method.

Further, errors in most probable values of the coefficients a, b, c, and d can be obtained by a statistical method from a distribution of the errors from approximation formula of (x, y), which are measured values. More specifically, when it is assumed that the error from the approximation formula of x, y is based on the Gaussian distribution, a standard deviation can be calculated for the coefficients a, b, c, and d from standard deviation of x, y, etc.

As the further simple example, a case where the state measure y is approximated with a first degree function of time x is described. In this case, the approximation formula can be expressed using coefficients a, b as shown in Eq. (2.2).

$$y=ax+b \qquad \text{Eq. (2.2)}$$

Further, the coefficients a, b are calculated through the following procedure. It is assumed that the number of measurement values is N; measurement values of each of x, y are expressed using subscripts "i" such as $y_i$, $x_i$, and there is almost no error in the measured value xi. Then, coefficients a, b are expressed as shown in Eq. (3.1) and Eq. (3.2), respectively. Further, standard errors $\sigma_a$, $\sigma_b$ of the coefficients a, b are expressed, using a standard deviation $\sigma_y$ of the error y expressed by Eq. (4.3), as Eq. (4.1) and Eq. (4.2).

$$a = \frac{N\sum x_i y_i - \sum x_i \sum y_i}{N\sum x_i^2 - (\sum x_i)^2} \qquad (3.1)$$

$$b = \frac{\sum x_i^2 \sum y_i - \sum x_i \sum x_i y_i}{N\sum x_i^2 - (\sum x_i)^2} \qquad (3.2)$$

$$\sigma_a = \sigma_y \sqrt{\frac{N}{N\sum x_i^2 - (\sum x_i)^2}} \qquad (4.1)$$

$$\sigma_b = \sigma_y \sqrt{\frac{\sum x_i^2}{N\sum x_i^2 - (\sum x_i)^2}} \qquad (4.2)$$

-continued where $$\sigma_y = \sqrt{\frac{1}{N-2}\Sigma(ax_i + b - y_i)^2} \quad (4.3)$$

Figure 7:
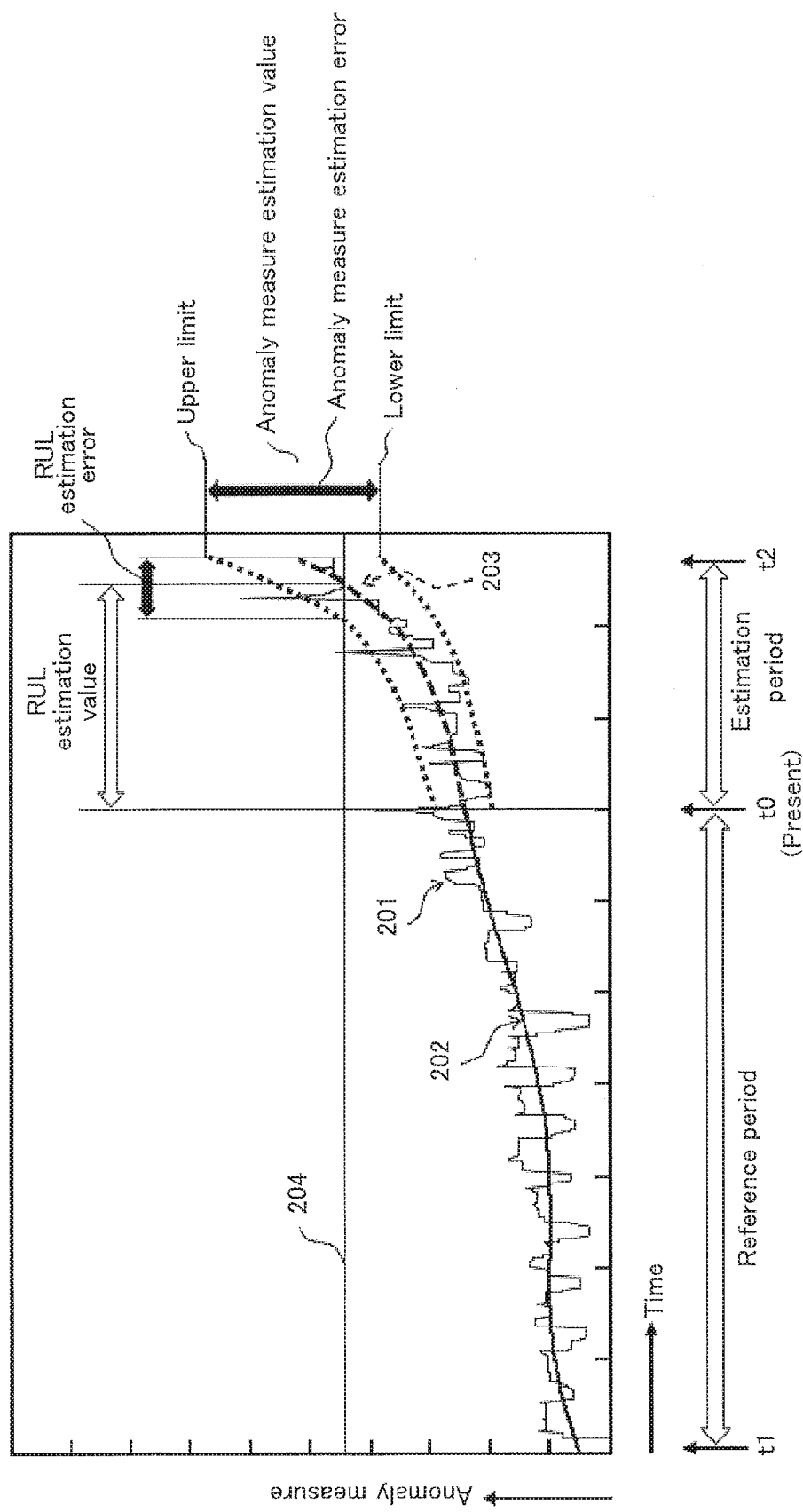
FIG. 7 is a graphical chart for explaining a method of the anomaly diagnosis when the error measure is used as the error measure in the first embodiment of the present invention.

The state measure estimating unit 14 inputs the coefficients and errors in coefficients of the polynomial expression as an approximation formula from the approximation formula calculator 13 and estimates a future state measure using the approximation formula in which a predetermined period from the present to a future is set as an estimation period (in FIG. 7, a period from time t0 to t2). The estimating the future state measure corresponds, for example, in a case where Eq. (2.1) is used as an approximation formula, to calculation of the state measure y at each time x with the coefficients a, b, c, d and an interval suitable for the estimation period (for example, an interval same as the sampling of the time series data). The state measure estimating unit 14 supplies the state measure calculated for the estimation period having a predetermined length to the RUL calculator 15 and the output unit 17.

Further, the estimation period of the state measure may be a period having a predetermined constant length, and can be specified using an appropriate input means such as a keyboard, a pointing device by an operator.

The RUL calculator (remaining useful lifetime calculator) 15 inputs the state measure calculated for the estimation period from the state measure estimating unit 14 and calculates an RUL (remaining useful lifetime) based on a variation of the state measure for the estimation period. The RUL calculator 15 supplies the calculated RUL to the output unit 17.

Figure 8:
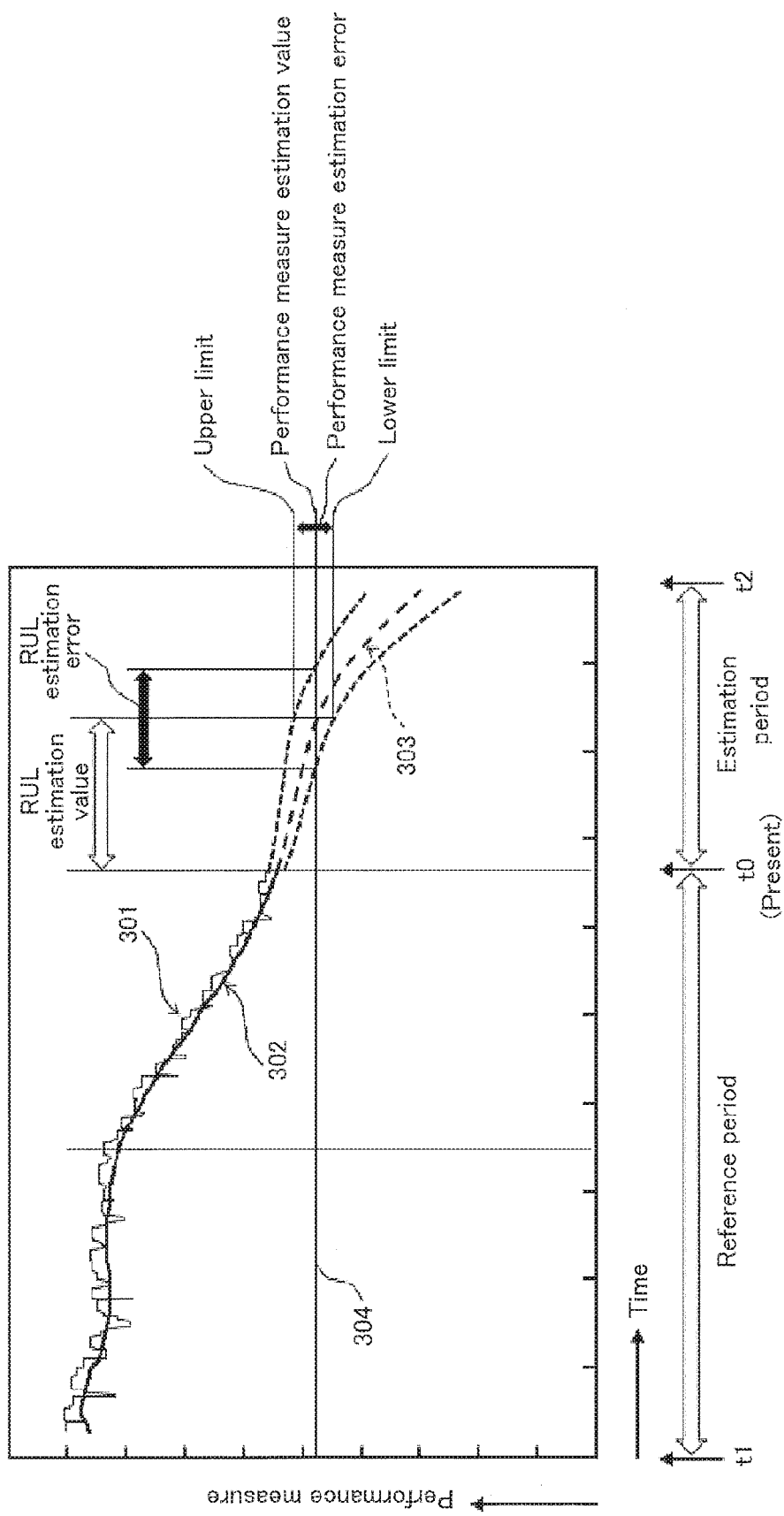
FIG. 8 is a graphical chart for explaining a method of the anomaly diagnosis when a performance measure is used as the state measure in the first embodiment of the present invention.

Now referring to FIGS. 7 and 8, a method of calculating an RUL is described. Further, FIG. 7 indicates a case where the abnormality is used as the state measure. FIG. 8 illustrates a case where the performance measure is used as the state measure.

In FIG. 7, the waveform 201 indicates the actual measured values of the anomaly measure after the filter process, wherein the waveform 202 indicated with a solid line indicates the anomaly measures until the current time calculated using the approximation formula. A waveform 203 indicated with a broken line indicates most probable values for the estimation period calculated using the approximation formula. Further, a period from past time t1 to the current time t0 is a reference period to be referred when the approximation formula is calculated.

Further, a threshold 204 indicates an upper limit of the anomaly measure which becomes a limit for normally operable period of the machine facility to normally operate. In other words, this indicates that the machine facility can operate until time when the waveform 203 indicating the estimated anomaly measures reaches the threshold 204. Accordingly, time from the current time t0 to when the estimated anomaly measures reaches the threshold 204 can be calculated as an estimation value of a long period RUL.

Further, in FIG. 8, a waveform 301 shows actual measurement values of the performance measure after the filtering process, and a waveform 302, which is indicated with a solid line, shows the performance measure until the current time calculated using the approximation formula, and the waveform 303, which is indicated with a broken line, shows most probable values of the performance measure for the estimation period calculated using the approximation formula. Further, the period from the past time t1 to the current time t0, is the reference period, which is referred during calculation of the approximation formula.

Further a threshold 304 indicates a lower limit of the performance measure, which is such a limit that the machine facility can operate at a predetermined performance level. In other words, this indicates that the machine facility is operable with a predetermined performance level until the time when the waveform 303 indicating the estimated performance measures reaches the threshold 304. Accordingly, time until the performance measure estimated from the current time t0 reaches the threshold 304 can be calculated as a long-period RUL estimation value.

In addition, in a case where the performance measure is used as the state measure because calculation is similar except that a relation between a direction of deterioration of state and the index value is opposite to the case where the anomaly measure is used as the state measure, description is continued mainly referring to FIG. 7.

Further, when the first approximation formula is calculated, the errors in the approximation formula, i.e., the errors in the coefficients in the polynomial expression, which is the approximation formula, are calculated, which provides the estimation of an upper limit and the lower limit of the approximation formula using the errors. As shown in FIG. 7, in the estimation period, the waveform 203 indicates most probable values of the estimated anomaly measures, and waveforms indicated with dot lines above and under the waveform 203 indicate the upper and lower limit values of the anomaly measure.

As described above, a reliability of the estimation value can be grasped by calculating the upper and lower limit values of the anomaly measure in a reliable section of 95% by using an approximation formula in which the coefficients a, b are varied from most probable values by variations which are provided by multiplying the standard errors $\sigma_a$, $\sigma_b$ by 1.96 in, for example, Eq. (2.2), in addition to the most probable value of the estimated anomaly measure.

Further, in addition to the estimated error of the anomaly measure, it may be possible to calculate the estimated error of RUL using time when the waveform of the upper and lower limit value of the anomaly measure exceeds the threshold 204 in addition to, or in place of, the estimated error of the abnormality.

Further, as shown in FIG. 7, the operator can easily grasp a future variation of the anomaly measure and its reliability (appropriateness) by providing the operator with display of each of the waveforms 201, 202, 203 and the threshold 204, an RUL estimation value, an RUL estimated error, etc.

Further, in the present embodiment, it is preferable that the anomaly measure is calculated whenever new diagnosis data (time series data) is acquired, the reference period is set again by adding the time corresponding to the latest anomaly measure to sequentially calculate the approximation formula, and further RUL is calculated again.

As described above, the approximation formula of the anomaly measure is calculated again with re-setting the reference period whenever the time series data is acquired, so that the RUL can be estimated on the basis of the latest approximation formula. In addition, with the re-calculation of the approximation formula and the RUL, display contents such as the waveforms shown in FIG. 7 are updated. Accordingly, the more the time series data is accumulated, with the higher accuracy the diagnosis of the machine facility such as estimation of the RUL, etc. can be provided. Further, because the polynomial expression is used as the approximation formula, the calculation of the approximation formula can be easily performed whenever the time series data is acquired though the time series data is acquired at extremely short intervals.

Returning to FIG. 1, explanation of the configuration about the anomaly diagnosis system 1 is continued.

The impending anomaly detector 16 inputs the state measure calculated regarding the latest time series data and determined whether the corresponding state measure is deteriorated relative to the predetermined threshold to detect the presence or absence of the anomaly of abnormality. In a case where the state measure is the anomaly measure, when the anomaly measure exceeds a predetermined threshold; or in a case where the state measure is the performance measure, when the performance measure decreases under a predetermined threshold; the impending anomaly detector 16 makes a diagnoses indicating "presence of the anomaly of abnormality" and supplies the diagnosis result to the output unit 17.

The output unit 17 inputs the time series data of the state measure calculated for the estimation period from the state measure estimating unit 14; the RUL from the RUL calculator 15; and a diagnosis result of the presence or absence of the anomaly of abnormality from the impending anomaly detector 16 to display the input data. Further the output unit 17 supplies the data, in place of or in addition to the display of the input data, to the AHM (asset health management) or an EAM (enterprise asset management), which are upper layer system (not-shown). The output unit 17 may further input past state measures from the state measure calculator 12 and the approximation formula from the approximation formula calculator 13 to provide a graphical indication of the data regarding the state measure (anomaly measures, performance measures) as shown in FIGS. 7 and 8.

The sensor data extracting unit 18 extracts one or more pieces of sensor data largely influencing the state measure from the multi-dimensional sensor data stored in the time series data storage 11 and supplies a type of the extracted sensor data to the state measure calculator 12. Decreasing the number of dimensions used for calculating the state measure can reduce a processing load for calculating the state measure. Further, the state measure calculator 12 may calculate the state measure with all types of the sensor data without using the sensor data extraction.

As the extracting method for the sensor data, for example, an impulse response between each of the sensor data can utilized.

First, an impulse response is checked for the state measure of each piece of sensor data using the time series data previously acquired, stored in the time series data storage 11 and the sensor data, which largely influencing a variation of the state measure, can be previously extracted.

Further, as other extracting method, when the state measure largely varies, the sensor data, which largely influencing the state measure, may be previously extracted.

When there are a lot of types of states to be estimated such as performance, and abnormality, the sensor data suitable for the type of the state is previously extracted. The type information of the sensor data corresponding to the type of the performance selected in accordance with an instruction by an operator may be supplied to the state measure calculator 12.

The reference period setting unit 19 inputs the time series data of past state measures from the state measure calculator 12 and determines a period of the time series data of the state measure to be referred for calculating the approximation formula by the approximation formula calculator 13. The reference period setting unit 19 supplies the reference period of the determined past state measures to the approximation formula calculator 13.

The reference period setting unit 19 determines the reference period from a predetermined start point to the present as described above. Accordingly the latest time series data is acquired, and the reference period is successively extended by addition of the latest data whenever the corresponding state measure is calculated.

[Operation of Anomaly Diagnosis System]

Figure 9:
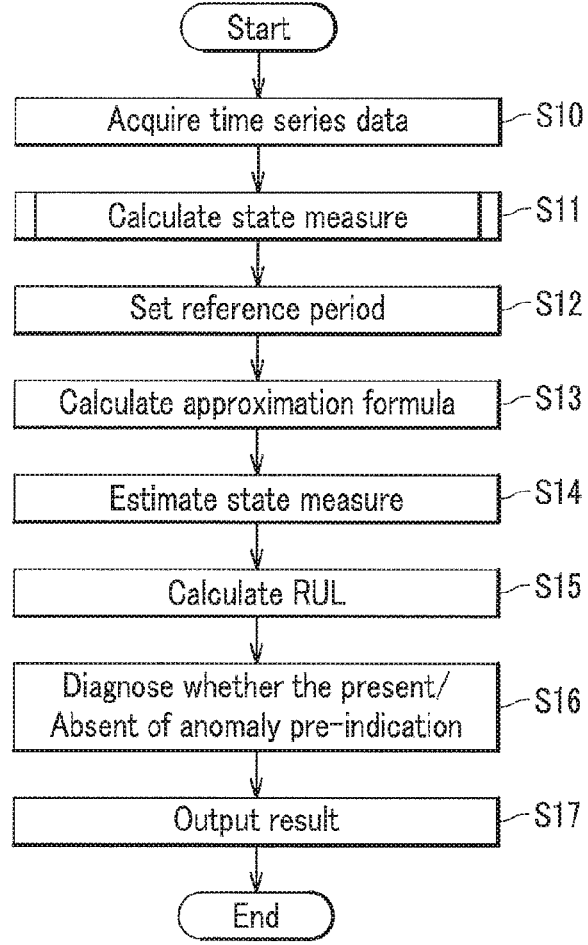
FIG. 9 is a flowchart illustrating a flow of the anomaly diagnosis process in the anomaly diagnosis system according to the first embodiment of the present invention.
Figure 10:
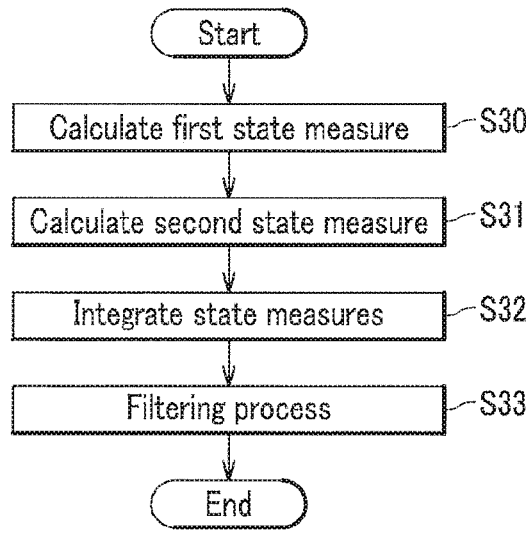
FIG. 10 is a flowchart illustrating a state measure calculating process in the flowchart shown in FIG. 9.

Next, referring to FIGS. 9 and 10 (appropriately, referring to FIGS. 1 and 2), an operation of the anomaly diagnosis process by the anomaly diagnosis system 1 according to the first embodiment is described.

As shown in FIG. 9, the anomaly diagnosis system 1 acquires the sensor data, which is a measurement value of the sensor installed in the machine facility as the time series data by the time series data receiver 10. The time series data acquired by the time series data receiver 10 is stored in the time series data storage 11 as a database for normal data. Further, the time series data in a state in which the machine facility is not normal, for example, the time series data of which appropriateness of the data has been denied by the estimating means (not shown) is not stored in the time series data storage 11.

Further, in the time series data storage 11, it is assumed that a quantity, necessary for calculating the state measure, of normal data is previously stored.

Next, in the anomaly diagnosis system 1, the state measure calculator 12 calculates, using the latest time series data acquired in the step S10 as the diagnosis data, the state measure of the diagnosis data appropriately referring past normal data (a step S11).

Referring to FIG. 10, the state measure calculation process step (S11) is described.

In the state measure calculator 12, the first state measure calculator 121 calculates the state measure using a first method (for example, the vector quantization method)(a step S30).

Next, in the state measure calculator 12, the second state measure calculator 122 calculates the state measure using a second method (for example, the local subspace method) (a step S31).

In addition, either of the step S30 or the step S31 can be performed previously and may be performed in parallel.

Further, it is assumed that the type of the sensor data used in the step S30 and the step S31 are previously extracted by the sensor data extracting unit 18.

In the state measure calculator 12, the state measure integrator 123 integrates the state measures calculated in the step S30 and a step S31 into one value (a step S32).

In the state measure calculator 12, the filtering processor 124 applies, using the state measure of which values are integrated into one value, a predetermined filtering process such as the minimum filter to the time series data of the state measure including the latest state measure. Further, it is assumed that the time series data of the state measure calculated by the state measure calculator 12 is stored in the storage in the state measure calculator 12.

Returning to FIG. 9, the operation of the anomaly diagnosis system 1 is continued.

The anomaly diagnosis system 1 sets the reference period of the time series data of the state measure used for calculating the approximation formula with the reference period setting unit 19 (step S12).

Next, the anomaly diagnosis system 1 calculates, using the approximation formula calculator 13, the approximation formula indicating variation in the state measure, using the time series data in the reference period set in a step S12 (step S13).

Next, the anomaly diagnosis system 1 calculates (estimates) the state measure at a predetermined time interval (for example, a sampling interval of the time series data) regarding a predetermined future period, which is the estimation period using the approximation formula calculated in a step S13 (a step S14).

Next, in the anomaly diagnosis system 1, the RUL calculator 15 calculates the RUL using the estimation value of the state measure calculated in the step S14 with the RUL calculator 15 (step S15).

Next, in the anomaly diagnosis system 1 diagnoses, the impending anomaly detector 16 diagnoses whether the anomaly of the abnormality is absent or present using the state measure of the diagnosis data calculated in the step S11 (step S16). Further, the step S16 can be executed any timing after execution of the step S11.

Next, in the anomaly diagnosis system 1 the output unit 17 displays the RUL calculated in the step S15, the presence or absence of the anomaly of the abnormality diagnosed in the step S16, and the diagnosis result such as the estimation of the state measure calculated in the step S14, etc. on the display (not shown) or/and supplies them to the upper layer system (step S17).

Further, it is preferable that the anomaly diagnosis system 1 performs the process from the step S10 to the step S17 whenever new time series data is acquired as the diagnosis data. This provides the anomaly diagnosis with an accuracy which is successively increased whenever the time series data is added.

As described above, according to the anomaly diagnosis system according to the first embodiment, a long term estimation of the machine facility can be provided at a preferable accuracy.

According to the first embodiment, there is provided, an anomaly diagnosis system of diagnosing a state of a machine facility, comprising:

a time series data receiver acquiring sensor data from a plurality of sensors installed in the machine facility as time series data;

a state measure calculator calculating an anomaly measure or a performance measure as a state measure being an index indicating a state of the machine facility by a statistical method in which the time series data is used as learned data, the anomaly measure being an index indicating a magnitude of deviation from a normal state of the machine facility, and the performance measure being an index indicating a performance of the machine facility;

an approximation formula calculator calculating an approximation formula approximating, with a polynomial expression, variation in the state measure calculated based on the time series data acquired from a past to the present;

a state measure estimating unit estimating the state measure until a predetermined future time using the approximation formula, wherein whenever the time series data receiver acquires the latest time series data, a reference period is successively extended by addition of time when the latest time series data is acquired, the reference period is a period in which the time series data corresponding to the state measure and is referred to calculate the approximation formula by the reference period setting unit and wherein the approximation calculator calculates the approximation formula using the state measure of the time series data acquired in the reference period.

In the anomaly diagnosis system as described above, whenever the time series data receiver acquires the time series data, the state measure calculator calculates the state measure of the latest time series data; the approximation calculator calculates the approximation; and the state measure estimating unit estimates a future state measure using the approximation.

The anomaly diagnosis system described above, may further comprises a filtering processor applying to the state measure a filtering process that calculates a maximum value, a minimum value, or a moving average in a predetermined time width, wherein the approximation calculator calculates the approximation using the state measure to which the filtering process is applied.

According to the first embodiment, there is provided, a anomaly diagnosis method of diagnosing a state of a machine facility, comprising:

a time series data acquiring step of acquiring sensor data as time series data from a plurality of sensors installed in the machine facility;

a state measure calculating step of calculating an anomaly measure or a performance measure as a state measure by a statistical method using the time series data as learned data, the anomaly measure being an index indicating a magnitude of deviation from a normal state of the machine facility, the performance measure being an index indicating a performance of the machine facility, the state measure being an index indicating a state of the machine facility;

an approximation formula calculating step of calculating an approximation formula approximating, with a polynomial expression, variation in the state measure calculated based on the time series data acquired from a past to the present;

a state measure estimating step of estimating the state measure until a predetermined future time using the approximation formula; wherein whenever the latest time series data is acquired in the time series data acquiring step, the reference period is successively extended by time length defined by addition of time when the latest time series data is acquired, the reference period being a period for which the time series data corresponding to the state measure referred to calculate the approximation in the approximation calculating step, and wherein in the approximation calculating step, the approximation is calculated using the state measure of the time series data acquired in the reference period.

Second Embodiment

Next, a anomaly system according to the second embodiment of the present invention is described.

As the state of the machine facility varies every moment, only if trend of the anomaly measure for a neighbor period is made whenever maintenance operation is made, as disclosed in JP2013-152655 A, there may be a case in which the prediction such as the estimation of the anomaly measure or estimation of RUL in a remote future cannot be made with a sufficient accuracy. Further, as disclosed in JP2013-58099 A, when time series data for a predetermined length period is used when the trend is calculated, both the case where a prediction in a long remote future such as the life time of the whole of the machine facility and the case where prediction is made in a period in the short future such as replacement of components.

Then, the per-indication diagnosis system according to the second embodiment provides a state of the machine facility as information for anomaly diagnosis by estimating both the short time period variation and the long time variation at a preferable accuracy.

[Configuration of Anomaly Diagnosis System]

The anomaly system according to the second embodiment has a basically the same configuration to the anomaly diagnosis system of the first embodiment unless otherwise mentioned. Accordingly, the anomaly diagnosis system 1 according to the second embodiment is described with reference to FIG. 1 and a duplicated description is omitted.

The anomaly diagnosis system 1 according to the second embodiment calculates the approximation formula (first approximation formula) using the state measure in the reference period which is relatively long to make a long-period prediction of the state measure, and calculates the approximation formula (second approximation formula) using the state measure in the reference period which is relatively short to makes a short-period prediction of the state measure using the second approximation formula.

The anomaly diagnosis system 1 according to the second embodiment is configured including, similarly to the first embodiment, the time series data receiver 10, the time series data storage 11, the state measure calculator 12, the approximation formula calculator 13, the state measure estimating unit 14, the RUL (remaining useful lifetime calculator) calculator 15, the impending anomaly detector 16, the output unit 17, the sensor data extracting unit 18, and the reference period setting unit 19.

The time series data receiver 10 and the time series data storage 11 are the same as those in the first embodiment, and a duplicated description is omitted.

The state measure calculator 12 includes the configuration shown in FIG. 2, similarly to the first embodiment and calculates the state measure in the same method.

In addition, different filtering processes may be applied to the state measure for calculating the first approximation formula and the state measure for calculating the second approximation formula.

For example, a low-pass filtering process, which removes or decreases components having a frequency higher than a predetermined frequency, may be performed for the state measure used for calculating the first approximation formula for the long-period anomaly diagnosis. This can suppress influence due to the short-period variation, so that a long-period anomaly diagnosis can be made with a high accuracy.

Further, a high-pass filtering process, which removes or decreases components having a frequency not higher than a predetermined frequency, may be applied to the state measure used for calculating the second approximation formula of the short-period anomaly diagnosis. This suppresses influence in which a base level is increased by long-period variations so that the short-period anomaly diagnosis can be made with a high accuracy.

Further, a minimum value filtering process or a maximum value filtering process, which are described above, may be combined with these filtering processes.

In addition, the state measure calculator 12 may calculate the state measure meeting the diagnosis object in accordance with the diagnosis objects of the machine facility in the long period or the short-period.

For example, when the anomaly diagnosis for the state of the whole of the machine facility is made as a long-period diagnosis, the state measure may be calculated using all or almost all of pieces of the obtained multi-dimension time series data or almost all elements. Further, when the anomaly diagnosis of the state of a part of units or a component level, of the machine facility is made as the diagnosis in the short period, it is possible to calculate the state measure using elements having a deep relation with the unit or components to be diagnosed out of the multi-dimension time series data.

Further, there may be mixed targets classified into targets using the anomaly measure as the state measure and targets using the performance measure as the state measure in accordance with the object of the diagnosis of the machine facility. For example, the performance measure is used as the state measure used for the long-period anomaly diagnosis and the anomaly measure is used as the state measure used for the short-period anomaly diagnosis.

Returning to FIG. 1, description of the configuration of the anomaly diagnosis system 1 is continued.

The approximation formula calculator 13 calculates an approximation formula by the polynomial expression indicating a variation of the corresponding state measure using the past and current state measure inputted from the state measure calculator 12. Further, the approximation formula calculator 13 in the embodiment inputs the data of the reference period, which is a period for which the time series data corresponding to the state measure to be referred for calculating the approximation formula has been acquired, from the reference period setting device 19 and calculates the approximation formula using the state measure of the time series data acquired for the corresponding reference period. The reference period is set such that the reference period setting device 19 selects either of a first period including time when the latest time series data is acquired or a second period, which is shorter than the first period and includes the time when the latest time series data is acquired.

The approximation formula calculator 13 calculates an approximation formula able to be fit to the time series data of the state measure in the reference period set by the reference period setting unit 19. Further, the approximation formula calculator 13 supplies the calculated approximation formula to the state measure estimating unit 14. Further, it is preferable that the approximation formula calculator 13 also calculates an error in the coefficients of the approximation formula. When the approximation formula calculator 13 calculates the errors in the coefficients, the errors in the coefficients are supplied to the state measure estimating unit 14.

For convenience, when the first period, which is relatively long, is set as the reference period, the approximation formula calculated using the state measure in the reference period is referred to as "first approximation formula". On the other hand, when a second period, which is relatively short, is set as the reference period, the approximation formula calculated using the state measure in the reference period is referred to as "second approximation formula".

For example, when the first approximation formula is used to make a diagnosis in a life time of the whole of the machine facility or a whole of a unit, it is preferable that the first period is set as all period from the initial stage when the machine facility as a diagnosis target starts a normal operation to the present, or a period from the start of the period of the stable operation to the present except a predetermined period in the initial period. In other words, it is preferable that the first period is extended whenever the time series data is acquired when the period length is the latest and the state measure of the data is calculated. As described above, the more the period to be referred for calculating the first approximation formula is extended, the more the influences due to a short period variation caused by deterioration of components are cancelled out, so that an estimation accuracy of variations over the long period using the first approximation formula can be improved.

Further, the first period may be a constant length without extension. More specifically, it is possible to define a period having a predetermined length from the current time when the diagnosis is started, as the first period. In other words, as time passes, the starting point of the first period (time at t1 in FIG. 12) is shifted.

For example, when a variation of past state measure includes a relatively large variation, this may largely influence on estimation of the state measure in a remote feature. Though there is such a relatively large variation, when the state measure becomes stable over a long period after that, when the start of the first period shifts after the variation period, it is possible to estimate with a sufficient accuracy the state measure in a remote future.

For example, the second approximation formula is used to diagnose one unit of the machine facility, or to diagnose a life or a replacing timing of each of components, it is preferable to make the second period have a constant length from the present on the basis of a design life time or past achievement of use of the unit or components as diagnosis target. In other words, as time passes, the starting point of the second period (time t21 in FIG. 12) shifts.

Further, when the state measure is recovered by a maintenance operation such as replacement of a component as a diagnosis target, it is preferable to set the second period to avoid that the second period includes the period before the maintenance operation. This provides a more appropriate estimation of the state measure after the maintenance operation.

Further, the approximation formula calculator 13 may calculate the first and second approximation formulas using state measures calculated using the time series data of the multi-dimensional vectors in which combinations of sensor data are different.

Further, the degree of the polynomial expressions which are the first approximation formula and the second approximation formula is not specifically limited and a polynomial expression having a degree of one or more can be used. The degree of the polynomial expression of the first approximation formula may be the same as the degree of the polynomial expression and may be different from each other. Further, the configuration is made such that the degree of the polynomial expression can be selected in accordance with an instruction by an operator.

Figure 12:
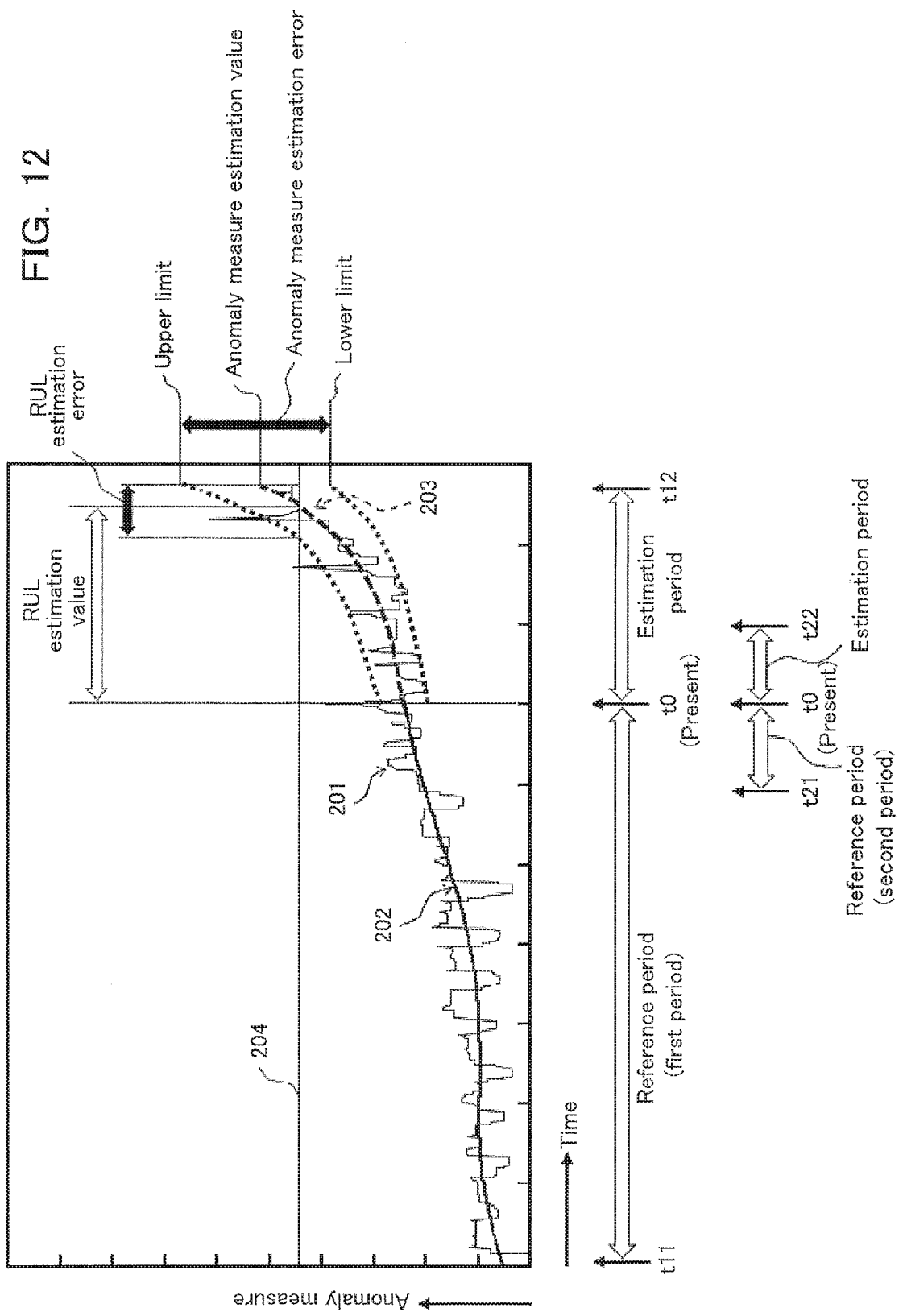
FIG. 12 is a graphical chart for explaining a method of the anomaly diagnosis when a performance measure is used as the state measure in a second embodiment of the present invention.

The state measure estimating unit 14 inputs the coefficients of the polynomial expression and the errors of the coefficients as the approximation formula from the approximation formula calculator 13, and estimates the state measure in future in which the predetermined period from the present to a future is set as the estimation period (in FIG. 12, when the first approximation formula is used, the period from time t0 to time t12, when the second approximation formula is used, the period from time t0 to time t22). The state measure estimating unit 14 supplies the state measure calculated regarding a predetermined long estimation period to the RUL calculator 15 and the output unit 17.

Further, it is preferable that the estimation period using the first approximation formula is made longer than the estimation period using the second approximation formula. In other words, it is preferable that the estimation period using the first approximation formula is caused to have a length depending on the life of the diagnosis target to easily grasp the variation for a long period, which may influence on the whole of the machine facility. Further, it is preferable that the estimation period using the second approximation formula is set in accordance with, for example, a life of the component. As described above, the estimation period is caused to have a length depending on a life time of the diagnosis target. This avoids a useless calculation.

Further, the estimation period of the state measure may be a period having a predetermined constant length, and may be specified using an appropriate input device such as a keyboard and a pointing device by an operator.

The RUL calculator (remaining useful lifetime calculator) 15 inputs the state measure calculated regarding the estimation period from the state measure estimating unit 14 and calculates an RUL (remaining useful lifetime) based on a variation of the state measure for the estimation period. The RUL calculator 15 supplies the calculated RUL to the output unit 17.

Further, when the RUL calculator 15 inputs, from the state measure estimating unit 14, the state measure calculated regarding the predetermined estimation period using the first approximation formula, the RUL calculator 15 calculates the RUL having a relatively long period such as a life time of the whole of the machine facility.

Further, when the RUL calculator 15 inputs the state measure calculated regarding the predetermined estimation using the second approximation formula, for example, the RUL calculator 15 calculates the RUL for a relatively short period such as the replacement timing of a component level.

Figure 13:
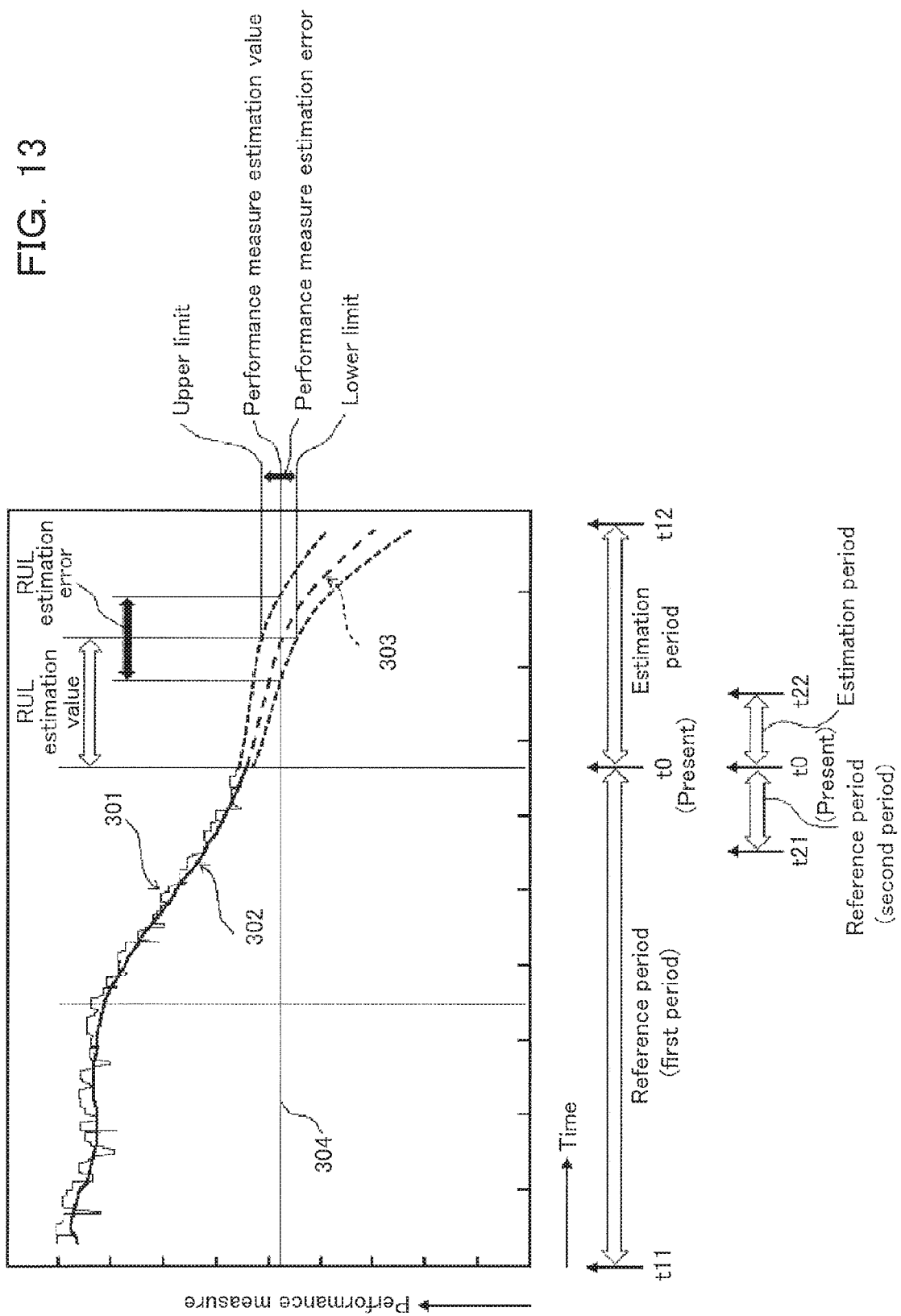
FIG. 13 is a graphical chart for explaining the method of the anomaly diagnosis using a performance measure as a state measure in the second embodiment of the present invention.

Referring to FIGS. 12 and 13, a method of calculating the RUL is described. FIG. 12 shows a case where the anomaly measure is used as the state measure, and FIG. 13 shows a case where the performance measure is used as the state measure.

In FIG. 12, the waveform 201 shows actual values of the abnormality after the filtering process. The waveform 202 shows, using a solid line, the anomaly measure calculated using the first approximation formula until the current time. The waveform 203 shows, using a broken line, most probable values of the anomaly measure for the estimation period calculated using the first approximation formula. Further the period from past time t11 to the current time t0 is the first period which is the reference period for calculating the approximation formula.

Further, the threshold 204 indicates the upper limit value of the anomaly measure, which is a limit of the machine facility to normally operate. In other words, this indicates that the machine facility operates normally until time when the waveform 203 of the estimated anomaly measure reaches the threshold 204. Accordingly, time from the current time t0 to when the estimated anomaly measures reaches the threshold 204 can be calculated as an estimation value of a RUL for a long period.

In FIG. 13, the waveform 301 shows actual measurement values of the performance measure after the filtering process, and the waveform 302, which is indicated with a solid line, shows the performance measure until the current time calculated using the first approximation formula, and the waveform 303, which is indicated with a broken line, shows most probable values of the performance measure for the estimation period calculated using the first approximation formula. The period from past time t11 to current time t0 is the first period, which is the reference period for calculating the approximation formula.

The threshold 304 indicates a lower limit of the performance measure, which is such a limit that the machine facility can operate at a predetermined performance level. This indicates that the machine facility can operates with the predetermined performance level until the time when the waveform 303 of the estimated performance measure reaches the threshold 304. Accordingly, time until the performance measure estimated from the current time t0 reaches the threshold 304 can be calculated as a long-period RUL estimation value.

In addition, in a case where the performance measure is used as the state measure because calculation is similar to the case where the anomaly measure is used, except that a relation between a direction of deterioration of state and the index value is opposite to the case where the anomaly measure is used as the state measure, description is continued mainly referring to FIG. 12.

Further, when the first approximation formula is calculated, the errors in the first approximation formula, i.e., the errors in the coefficients in the polynomial expression, which is the first approximation formula, are calculated, which provides the estimation of an upper limit and the lower limit of the first approximation formula using the errors. As shown in FIG. 12, in the estimation period, the waveform 203 indicates most probable values of the estimated anomaly measures, and waveforms indicated with dot lines above and under the waveform 203 indicate the upper and lower limit values of the anomaly measure. appropriateness Further, as shown in FIG. 12, the operator can easily grasp a future variation of the anomaly measure and its reliability (appropriateness) by providing the operator with display of each of the waveforms 201, 202, 203 and the threshold 204, an RUL estimation value, an RUL estimated error, etc.

Further, in the present embodiment, it is preferable that the anomaly measure is calculated whenever new diagnosis data (time series data) is acquired, the reference period is set again by adding the time corresponding to the latest anomaly measure to sequentially calculate the approximation formula, and further RUL is calculated again.

As described above, the first approximation formula of the anomaly measure is calculated again with re-setting the reference period whenever the time series data is acquired, so that the RUL can be estimated on the basis of the latest approximation formula. In addition, with the re-calculation of the first approximation formula and the RUL, display contents such as the waveforms shown in FIG. 12 are updated. Accordingly, the more the time series data is accumulated, the higher accuracy the diagnosis of the machine facility such as estimation of the RUL, etc. can be provided with. Further, because the polynomial expression is used as the first approximation formula, the calculation of the first approximation formula can be easily performed whenever the time series data is acquired though the time series data is acquired at extremely short intervals.

As calculation of the long-period RUL using the first approximation formula, a short-period RUL using a second approximation formula also can be calculated using the state measure calculated for the corresponding estimation period (in FIG. 12, a period from time t0 to time t22).

Returning to FIG. 1, explanation of the configuration about the anomaly diagnosis system 1 is continued.

The impending anomaly detector 16 is similar to that in the first embodiment, and a duplicated explanation is omitted.

The output unit 17 inputs the time series data of the state measure calculated for the long and short estimation periods from the state measure estimating unit 14 and the long-period and the short-period RUL from the RUL calculator 15, and a diagnosis result of the presence or absence of the anomaly of abnormality from the impending anomaly detector 16 to display the input data. Further the output unit 17 supplies the data, in place of or in addition to the display of the input data, to the AHM or the EAM, which are upper layer system (not-shown). The output unit 17 further inputs past state measures from the state measure calculator 12 and the first approximation formula and/or a second approximation formula from the approximation formula calculator 13 to provide a graphical indication of the data regarding the state measure (anomaly measures, performance measures) as shown in FIGS. 12 and 13.

The sensor data extracting unit 18 extracts one or more pieces of sensor data largely influencing the state measure of the machine facility and parts to be diagnosis target from the multi-dimensional sensor data stored in the time series data storage 11 and supplies a type of the extracted sensor data to the state measure calculator 12. Decreasing the number of dimensions used for calculating the state measure can reduce a processing load for calculating the state measure. Further, for example, when the whole of the machine facility is a diagnosis target, the state measure calculator 12 may calculate the state measure with all types of the sensor data without using the sensor data extraction.

As the sensor data extraction method, the similar method to the first embodiment can be used.

The reference period setting unit 19 inputs the time series data of past state measures from the state measure calculator 12 and determines a period of the time series data of the state measure to be referred for calculating the approximation formula by the approximation formula calculator 13. The reference period setting unit 19 selects either of the first period or the second period as the reference period of determined past state period in accordance with, for example, an instruction by the operator and supplies information of the selected period to the approximation formula calculator 13.

In the present embodiment, the approximation formula calculator 13 is configured calculating the approximation formula in accordance with the first or second period set as the reference period. However, another configuration can be provided with a subunit (for example, a first approximation formula calculator) for calculating the approximation formula in which the reference period is the first period and a subunit (for example, a second approximation formula calculator) for calculating the approximation formula in which the reference period is the second period, in which two approximation formulas can be processed in parallel. In this case, the reference period setting unit 19 sets the first period as a reference period for the first approximation formula calculator and the second period as a reference period for the second approximation formula calculator.

When the approximation formula calculator 13 is provided with the two subunits corresponding to the first period and the second period as describe above, the state measure estimating unit 14 and the RUL calculator 15 further include two subunits corresponding to the first and the second periods, respectively, to provide parallel calculation of two systems of state measure estimation and the RUL calculation.

In the present embodiment, the future state measure is estimated by using two approximation formulas, i.e., the first approximation formula and the second approximation formula. However, the future state measure can be estimated using more than two approximation formulas of which reference periods for the past state measure are different. In this case, though the reference periods are the same, a unit may be included in the approximation formula calculator 13, the device calculating the approximation formula using the multi-dimension vector time series data having a combination of sensor data in use, which is different from other combination. Further, timing of calculating the first approximation formula and the timing of calculating the second approximation formula may be the same or different. For example, calculations are made at different intervals. In accordance with needs, the configuration is made such that either or both the first approximation formula and the second operation can be selected by the operator.

[Operation of Anomaly Diagnosis System]

The anomaly diagnosis system according to the second embodiment operates in a procedure similar to that of the anomaly system in the first embodiment unless otherwise mentioned in the below description.

Accordingly, referring to FIGS. 9 and 10 (appropriately, referring to FIGS. 1 and 2), an operation of the anomaly diagnosis process by the anomaly diagnosis system 1 according to the first embodiment is described. Further, regarding the steps which are the same, a duplicated explanation is omitted.

The step S10 that acquires the time series data is similar to that in the first embodiment, and a duplicated description is omitted.

The step S11 that calculates the state measure is executed similarly to the first embodiment. More specifically, the step S11 is executed through the steps shown in FIG. 10.

Further, in the step S11, the state measure used for a long period anomaly diagnosis is different from the state measure used for the short period anomaly diagnosis, the state measures corresponding to the long period anomaly diagnosis and the short period anomaly diagnosis. Further, when the state measure used for the long period anomaly diagnosis and the state measure used for the short period anomaly diagnosis are different, the process from the step S30 to the step S33 are performed separately.

The anomaly diagnosis system 1 selectively sets either of the first period or the second period as the reference period of the time series data of the state measure used for calculating the approximation formula with the reference period setting unit 19 (step S12).

Next, the anomaly diagnosis system 1 calculates, using the approximation formula calculator 13, the approximation formula indicating variation in the state measure, using the time series data for the reference period (step S13). More specifically, the anomaly diagnosis system 1 calculates the approximation formula using the time series data for the reference period set by the approximation formula calculator 13.

Next, the anomaly diagnosis system 1 calculates (estimates) the state measure at a predetermined time interval (for example, a sampling interval of the time series data) regarding a predetermined future period, which is the estimation period using the approximation formula calculated in a step S13 (a step S14). More specifically, when in the anomaly diagnosis system 1, the first approximation formula is used by the state measure estimating unit 14, the long period state measure is estimated and when the second approximation formula is used, the short period state measure is estimated.

Next, the anomaly diagnosis system 1 calculates the RUL using the estimation value of the state measure calculated in the step S14 with the RUL calculator 15. More specifically, in the anomaly diagnosis system 1, when the estimation value of the long period state measure is used, the long period RUL is calculated and when the estimation value for the short-period of state measure is calculated, the short-period RUL is calculated.

Further, when the state measure estimating process and the RUL calculation process, using the first approximation formula, and the state measure estimating process and the RUL calculation process, using the second approximation formula, are executed at the same timing, respective sequential processes are successively executed. For example, the first period is set as the reference time in the step S12, the steps S13 to S15 are successively executed, after that, processing returning to the step S12, the second period is set as the reference period, and the step S13 to the step S15 are successively executed.

The step S16 that diagnoses the presence or absence of the anomaly of abnormality and the step S17 that outputs the diagnosis result are similar to the first embodiment, and a duplicated description is omitted.

Further, it is preferable to perform the process from the step S10 to the step S17 whenever new time series data is acquired as the diagnosis data.

Further, in the present embodiment, the long period anomaly diagnosis and the short period anomaly diagnosis are selectively or successively executed. However the present invention is not limited to this. When the approximation formula calculator 13 including the subunit for calculating the first approximation formula and the subunit for calculating the second approximation formula can execute the processes in parallel, in the step S12, the reference period setting unit 19 can set the first period as the reference period to the subunit calculating the first approximation formula and the second period as the reference period to the subunit for calculating the second approximation formula. Further, it is also possible that the state measure estimating unit 14 and the RUL calculator 15 including two systems of subunits, respectively, execute the processes from the approximation formula calculator 13 to the step S15 in parallel.

As described above, according to the anomaly diagnosis system according to the first embodiment, a long period estimation of the machine facility can be provided at a preferable accuracy.

Further, the present invention is not limited to the embodiments described above, and includes various modifications. For example, the embodiments described above provides detailed description for easy understanding the present invention, but the present invention is not limited to the configuration including all described elements. Further, a part of a configuration of an embodiment can be replaced with a configuration in other embodiments. Further, a part of each of the embodiments can be added to or replaced with other configuration and corresponding to the part in other configuration of other embodiment may be deleted.

Further, a part or all of each of the configurations, functions, processing parts, processing methods can be realized with hardware, for example, an integrated circuit may be so designed. Further, each of the configurations and functions can be realized with software by executing a program providing the function by a processor. The information of the program providing each of the functions and information on a tape, a file, etc. can be stored in a recording unit such as a memory, a hard disk drive, an SSD (Solid State Drive) or on a recording medium such as an IC card, an SSD card, a DVD.

Further, control lines and data lines are illustrated for the explanation, and not all of the control lines and the data lines are shown. In actual, it is natural that all parts of configurations are connected to each other.

According to the second embodiment, there is provided, an anomaly diagnosis system diagnosing a state of a machine facility, comprising:

a time series data receiver acquiring sensor data as time series data from a plurality of sensors installed in the machine facility;

a state measure calculator calculating an anomaly measure or a performance measure as a state measure being an index indicating a state of the machine facility, by a statistical method in which the time series data is used as learned data, the anomaly measure being an index indicating a magnitude of deviation from a normal state of the machine facility, and the performance measure being an index indicating a performance of the machine facility;

an approximation formula calculator calculating an approximation formula approximating, with a polynomial expression, variation in the state measure calculated based on the time series data acquired from a past to the present;

a state measure estimating unit estimating the state measure until a predetermined future time using the approximation formula; and a reference period setting unit setting a reference period being a period for which the time series data corresponding to the state measure is acquired, the approximation calculator referring the reference period to calculate the approximation formula, wherein the reference period setting unit sets, as the reference period, a first period including time when latest time series data is acquired or a second period shorter than the first period and including the time when the latest time series data is acquired, and wherein the approximation calculator calculates the approximation formula using the state measure regarding the time series data acquired for the reference period set by the reference period setting unit.

In the anomaly diagnosis system, wherein, whenever the time series data receiver acquires the latest time series data, the first period is successively extended by addition of time when the latest time series data is acquired.

In the anomaly diagnosis system described above, the first period has a predetermined time length including the time when the latest time series data is acquired.

In the anomaly diagnosis system described above, the second period has a predetermined time length including the time when the latest time series data is acquired.

In the anomaly diagnosis system described above, a period regarding which a future state measure is estimated using a first approximation formula is longer than a period regarding which a future state measure is estimated using a second approximation formula, the first approximation formula is the approximation formula calculated using the state measure of the time series data acquired for the first period, and the second approximation formula is the approximation formula calculated using a future state measure of the time series data acquired for the second period.

The anomaly diagnosis system described above, further comprises a filtering processor applying to the state measure a filtering process calculating a maximum value, a minimum value, or a moving average of the state measure in a predetermined time width, wherein the approximation calculator calculates the approximation using the state measure to which the filtering process is applied.

According to the second embodiment, there is an anomaly diagnosis method of diagnosing a state of a machine facility, comprising:

a time series data acquiring step that acquires sensor data as time series data from a plurality of sensors installed in the machine facility;

a state measure calculating step that calculates an anomaly measure or a performance measure as a state measure being an index indicating a state of the machine facility by a statistical method in which the time series data is used as learned data, the anomaly measure being an index indicating a magnitude of deviation from a normal state of the machine facility, and the performance measure being an index indicating a performance of the machine facility;

an approximation calculating step calculating an approximation formula approximating, with a polynomial expression, variation in the state measure calculated based on the time series data acquired from a past to the present;

a state measure estimating step that estimates the state measure until a predetermined future time using the approximation formula;

a reference period setting step that sets a reference period being a period for which the time series data corresponding to the state measure is acquired, the period being referred to calculate the approximation in the approximation calculating step, wherein in the reference period setting process step, the reference period is set to either of a first period including time when latest time series data is acquired or a second period shorter than the first period and including the time when the latest time series data is acquired and wherein in the approximation calculating step, the approximation formula is calculated using the state measure regarding the time series data acquired for the reference period set by the reference period setting step.

DESCRIPTION OF REFERENCE SYMBOLS 1 anomaly diagnosis system
10 time series data receiver
11 time series data storage
12 state measure calculator
13 approximation formula calculator
14 state measure estimating unit
15 RUL calculator (remaining useful lifetime calculator)
16 impending anomaly detector
17 output unit
18 sensor data extracting unit
19 reference period setting unit
121 first state measure calculator
122 second state measure calculator
123 state measure integrator
124 filtering processor
200 waveform of anomaly
201 waveform of anomaly after filtering process
202 waveform of approximation formula
203 waveform of approximation formula in estimation period
204 threshold
301 waveform of performance measure after filtering process
302 waveform of approximation formula
303 waveform of approximation formula in estimation period
304 threshold

The invention claimed is:

1. An anomaly diagnosis system diagnosing a state of a machine facility, comprising:

a time series data receiver acquiring sensor data as time series data from a plurality of sensors installed in the machine facility;

a state measure calculator calculating an anomaly measure or a performance measure as a state measure being an index indicating a state of the machine facility, by a statistical method in which the time series data is used as learned data, the anomaly measure being an index indicating a magnitude of deviation from a normal state of the machine facility, and the performance measure being an index indicating a performance of the machine facility;

an approximation formula calculator calculating an approximation formula approximating, with a polynomial expression, variation in the state measure calculated based on the time series data acquired from a past to the present, the approximation formula indicating future approximation of variation of the state measure;

a state measure estimating unit estimating the state measure until a predetermined future time using the approximation formula;

a reference period setting unit setting a reference period being a period for which the time series data corresponding to the state measure is acquired, the approximation formula calculator referring the reference period to calculate the approximation formula; and an output which outputs a diagnose result of the state of the machine facility using the estimated state measure, wherein the reference period setting unit sets, as the reference period, a first period including time when latest time series data is acquired or a second period shorter than the first period and including the time when the latest time series data is acquired, and wherein the approximation formula calculator calculates the approximation formula using the state measure regarding the time series data acquired for the reference period set by the reference period setting unit.

2. The anomaly diagnosis system as claimed in claim 1, wherein, whenever the time series data receiver acquires the latest time series data, the first period is successively extended by a time length defined by addition of time when the latest time series data is acquired.

3. The anomaly diagnosis system as claimed in claim 2, wherein the second period has a predetermined time length including the time when the latest time series data is acquired.

4. The anomaly diagnosis system as claimed in claim 2, wherein a period regarding which a future state measure is estimated using a first approximation formula is longer than a period regarding which a future state measure is estimated using a second approximation formula, the first approximation formula is the approximation formula calculated using the state measure of the time series data acquired for the first period, and the second approximation formula is the approximation formula calculated using a future state measure of the time series data acquired for the second period.

5. The anomaly diagnosis system as claimed in claim 2, further comprising a filtering processor applying to the state measure a filtering process that calculates a maximum value, a minimum value, or a moving average of the state measure in a predetermined time width,
wherein the approximation formula calculator calculates the approximation formula using the state measure to which the filtering process is applied.

6. The anomaly diagnosis system as claimed in claim 1, wherein the first period has a predetermined time length including the time when the latest time series data is acquired.

7. The anomaly diagnosis system as claimed in claim 6, wherein the second period has a predetermined time length including the time when the latest time series data is acquired.

8. The anomaly diagnosis system as claimed in claim 6, wherein a period regarding which a future state measure is estimated using a first approximation formula is longer than a period regarding which a future state measure is estimated using a second approximation formula, the first approximation formula is the approximation formula calculated using the state measure of the time series data acquired for the first period, and the second approximation formula is the approximation formula calculated using a future state measure of the time series data acquired for the second period.

9. The anomaly diagnosis system as claimed in claim 6, further comprising a filtering processor applying to the state measure a filtering process calculating a maximum value, a minimum value, or a moving average of the state measure in a predetermined time width,
wherein the approximation formula calculator calculates the approximation formula using the state measure to which the filtering process is applied.

10. The anomaly diagnosis system as claimed in claim 1, wherein the second period has a predetermined time length including the time when the latest time series data is acquired.

11. The anomaly diagnosis system as claimed in claim 1, wherein a period regarding which a future state measure is estimated using a first approximation formula is longer than a period regarding which a future state measure is estimated using a second approximation formula, the first approximation formula is the approximation formula calculated using the state measure of the time series data acquired for the first period, and the second approximation formula is the approximation formula calculated using a future state measure of the time series data acquired for the second period.

12. The anomaly diagnosis system as claimed in claim 1, further comprising a filtering processor applying to the state measure a filtering process calculating a maximum value, a minimum value, or a moving average of the state measure in a predetermined time width,
wherein the approximation formula calculator calculates the approximation formula using the state measure to which the filtering process is applied.

13. A method of diagnosing a state of a machine facility, comprising:

a time series data acquiring step that acquires sensor data as time series data from a plurality of sensors installed in the machine facility;

a state measure calculating step that calculates an anomaly measure or a performance measure as a state measure being an index indicating a state of the machine facility by a statistical method in which the time series data is used as learned data, the anomaly measure being an index indicating a magnitude of deviation from a normal state of the machine facility, and the performance measure being an index indicating a performance of the machine facility;

an approximation formula calculating step that calculates variation of the state measure calculated based on the time series data acquired from a past to the present by an approximation formula of a polynomial expression, the approximation formula indicating future approximate of the variation of the state measure;

a state measure estimating step that estimates the state measure until a predetermined future time using the approximation formula;

a reference period setting step that sets a reference period being a period for which the time series data corresponding to the state measure is acquired, the period being referred to calculate the approximation formula in the approximation formula calculating step; and an outputting step which outputs a diagnose result of the state of the machine facility using the estimated state measure, wherein in the reference period setting process step, the reference period is set to either of a first period including time when latest time series data is acquired or a second period shorter than the first period and including the time when the latest time series data is acquired, and wherein in the approximation formula calculating step, the approximation formula is calculated using the state measure regarding the time series data acquired for the reference period set by the reference period setting step.

14. An anomaly diagnosis system of diagnosing a state of a machine facility, comprising:

a time series data receiver acquiring sensor data from a plurality of sensors installed in the machine facility as time series data;

a state measure calculator calculating an anomaly measure or a performance measure as a state measure being an index indicating a state of the machine facility by a statistical method in which the time series data is used as learned data, the anomaly measure being an index indicating a magnitude of deviation from a normal state of the machine facility, and the performance measure being an index indicating a performance of the machine facility;

an approximation formula calculator calculating an approximation formula approximating, with a polynomial expression, variation in the state measure calculated based on the time series data acquired from a past to the present, the approximation formula indicating future approximation of variation of the state measure;

a state measure estimating unit estimating the state measure until a predetermined future time using the approximation formula; and an output which outputs a diagnose result of the state of the machine facility using the estimated state measure, wherein whenever the time series data receiver acquires the latest time series data, a reference period is successively extended by a time length defined by addition of time when the latest time series data is acquired, and wherein the approximation formula calculator calculates the approximation formula using the state measure of the time series data acquired in the reference period.

15. The anomaly diagnosis system as claimed in claim 14, wherein whenever the time series data receiver acquires the time series data, the state measure calculator calculates the state measure of the latest time series data; the approximation formula calculator calculates the approximation formula; and the state measure estimating unit estimates a future state measure using the approximation formula.

16. The anomaly diagnosis system as claimed in claim 15, further comprising a filtering processor applying to the state measure a filtering process that calculates a maximum value, a minimum value, or a moving average in a predetermined time width, wherein the approximation formula calculator calculates the approximation formula using the state measure to which the filtering process is applied.

17. The anomaly diagnosis system as claimed in claim 14, further comprising a filtering processor applying to the state measure a filtering process that calculates a maximum value, a minimum value, or a moving average in a predetermined time width, wherein the approximation formula calculator calculates the approximation formula using the state measure to which the filtering process is applied.

* * * * *